(12) United States Patent
Naiki et al.

(10) Patent No.: US 10,601,528 B2
(45) Date of Patent: Mar. 24, 2020

(54) COMMUNICATION TERMINAL AND WIRELESS SENSOR NETWORK SYSTEM

(71) Applicant: Rohm Co., Ltd., Kyoto (JP)

(72) Inventors: Takashi Naiki, Kyoto (JP); Mitsuhiko Noda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 359 days.

(21) Appl. No.: 15/288,040

(22) Filed: Oct. 7, 2016

(65) Prior Publication Data

US 2017/0026814 A1 Jan. 26, 2017

Related U.S. Application Data

(63) Continuation of application No. PCT/JP2015/054233, filed on Feb. 17, 2015.

(30) Foreign Application Priority Data

Apr. 11, 2014 (JP) ................................. 2014-082131

(51) Int. Cl.
*H04B 17/318* (2015.01)
*H04Q 9/00* (2006.01)
(Continued)

(52) U.S. Cl.
CPC ............ *H04B 17/318* (2015.01); *H04Q 9/00* (2013.01); *H04W 4/20* (2013.01); *H04W 24/08* (2013.01);
(Continued)

(58) Field of Classification Search
CPC ... H04W 4/20; H04W 24/08; H04W 52/0216; H04W 52/0219; H04W 52/0274;
(Continued)

(56) References Cited

U.S. PATENT DOCUMENTS

| | | | |
|---|---|---|---|
| 2006/0187873 A1* | 8/2006 | Friday ................... | H04W 48/20 370/328 |
| 2007/0051872 A1* | 3/2007 | Goldberg ............. | G06Q 10/087 250/208.1 |

(Continued)

FOREIGN PATENT DOCUMENTS

| | | |
|---|---|---|
| JP | 06-325284 | 11/1994 |
| JP | 2005-505872 | 2/2005 |

(Continued)

OTHER PUBLICATIONS

Japan Patent Office, International Search Report for PCT/JP2015/054233 dated Mar. 31, 2015.

(Continued)

*Primary Examiner* — Jung H Park
(74) *Attorney, Agent, or Firm* — Fish & Richardson P.C.

(57) ABSTRACT

The sensor node communication terminal includes: a sensor capable of collect sensor information at an installed location in autonomous timing; a control unit connected to the sensor and capable of executing calculation processing of the sensor information; a memory connected to the control unit; a wireless transmission/reception unit connected to the control unit; an antenna connected to the wireless transmission/reception unit and capable of wirelessly transmitting the sensor information or a result of the calculation processing of the sensor information; a power supply unit connected to the control unit; and a timer connected to the control unit, wherein second wireless transmission data can be received from a host side during only a predetermined time period after transmission of wireless transmission data is completed. Moreover, there is provided a wireless sensor network system to which a plurality of such sensor node communication terminals can be applied.

14 Claims, 22 Drawing Sheets

(51) Int. Cl.
*H04W 52/02* (2009.01)
*H04W 24/08* (2009.01)
*H04W 4/20* (2018.01)
*H04W 84/18* (2009.01)

(52) U.S. Cl.
CPC ... *H04W 52/0216* (2013.01); *H04W 52/0219* (2013.01); *H04W 52/0274* (2013.01); *H04Q 2209/40* (2013.01); *H04Q 2209/845* (2013.01); *H04W 84/18* (2013.01); *Y02D 70/00* (2018.01)

(58) Field of Classification Search
CPC ..... H04W 84/18; Y02D 70/00; H04B 17/318; H04Q 9/00; H04Q 2209/40; H04Q 2209/845
See application file for complete search history.

(56) References Cited

U.S. PATENT DOCUMENTS

| | | | |
|---|---|---|---|
| 2007/0099678 A1 | 5/2007 | Kim et al. | |
| 2007/0206510 A1 | 9/2007 | Morris et al. | |
| 2007/0262863 A1* | 11/2007 | Aritsuka | H04B 17/27 340/539.22 |
| 2008/0293404 A1* | 11/2008 | Scherzer | H04W 84/18 455/426.1 |
| 2010/0002610 A1* | 1/2010 | Bowser | G06F 1/3203 370/311 |
| 2011/0187504 A1* | 8/2011 | Sadok | H01Q 1/28 340/10.1 |
| 2012/0235831 A1 | 9/2012 | Chindo | |
| 2012/0296384 A1* | 11/2012 | Daynes | A61N 1/3993 607/5 |

FOREIGN PATENT DOCUMENTS

| | | | |
|---|---|---|---|
| JP | 2006-208133 | | 8/2006 |
| JP | 2006208133 A | * | 8/2006 |
| JP | 2006-313541 | | 11/2006 |
| JP | 2006313541 A | * | 11/2006 |
| JP | 2008-060940 A | | 3/2008 |
| JP | 2008-091981 A | | 4/2008 |
| JP | 2008-131467 A | | 6/2008 |
| JP | 2009-239339 | | 10/2009 |
| JP | 2012-198034 | | 10/2012 |
| JP | 2013-102263 A | | 5/2013 |

OTHER PUBLICATIONS

The State Intellectual Property Office of People's Republic of China; First Office Action mailed in counterpart Chinese Patent Application No. 201580018930.2 (dated Nov. 1, 2018), with English-language translation.

Notification of Sending Duplicate Written Opposition mailed in counterpart Japanese patent No. 6322037 (dated Dec. 4, 2018) with translation.

Japanese Patent Office; Notice of Reasons for Revocation mailed in counterpart Japanese patent No. 6322037 (dated Jan. 29, 2019) with translation.

European Patent Office; Supplementary Partial European Search Report mailed in counterpart European Patent Application No. 15776784.9 (dated Nov. 6, 2017).

* cited by examiner

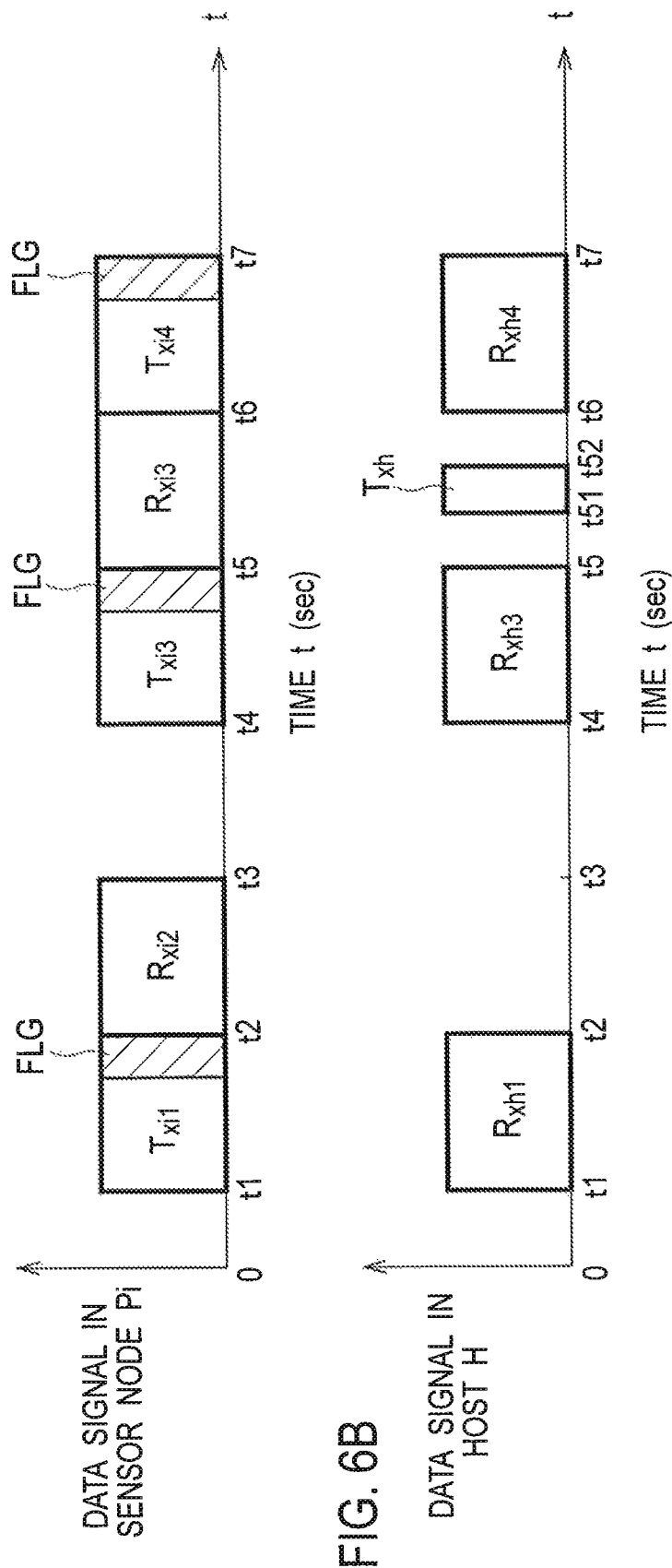

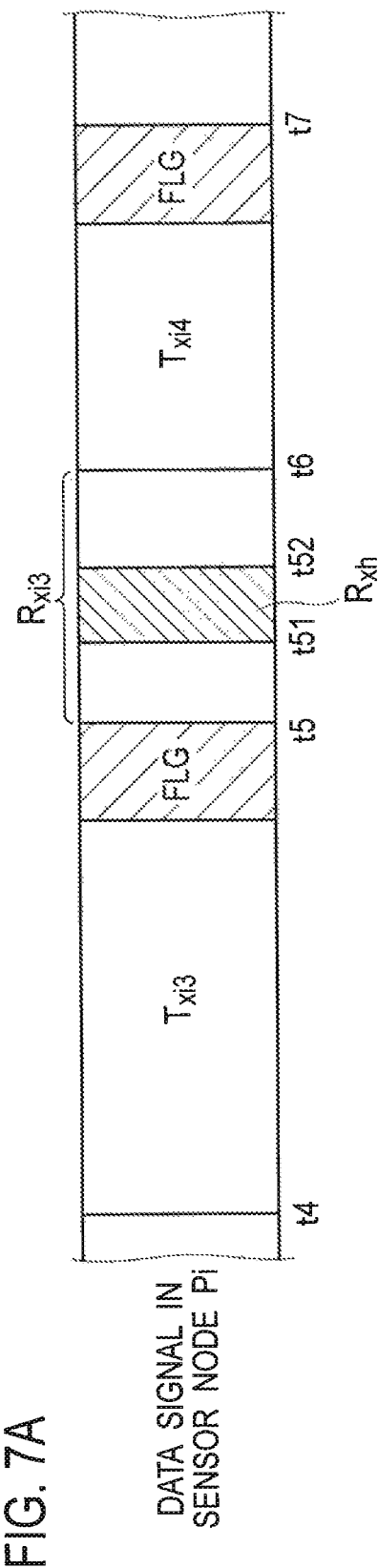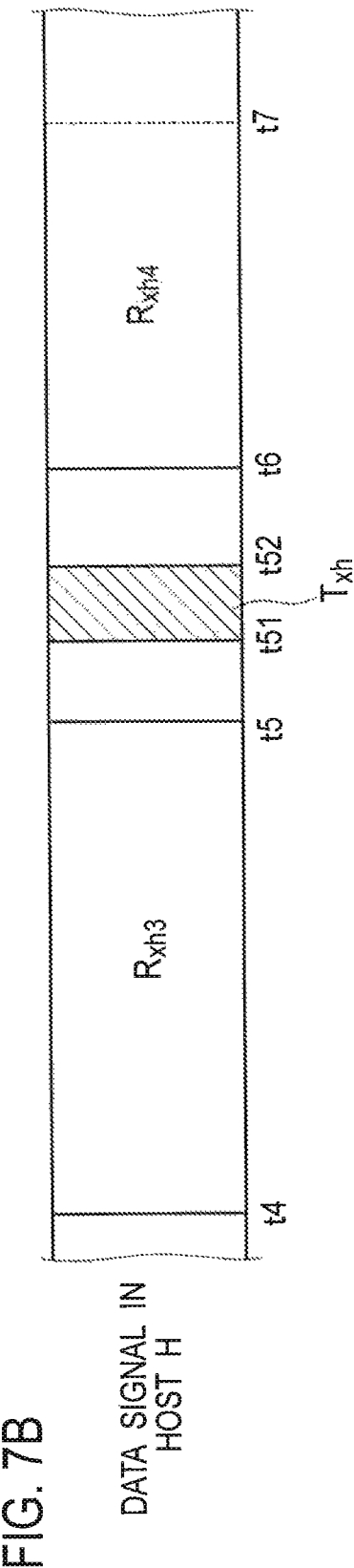

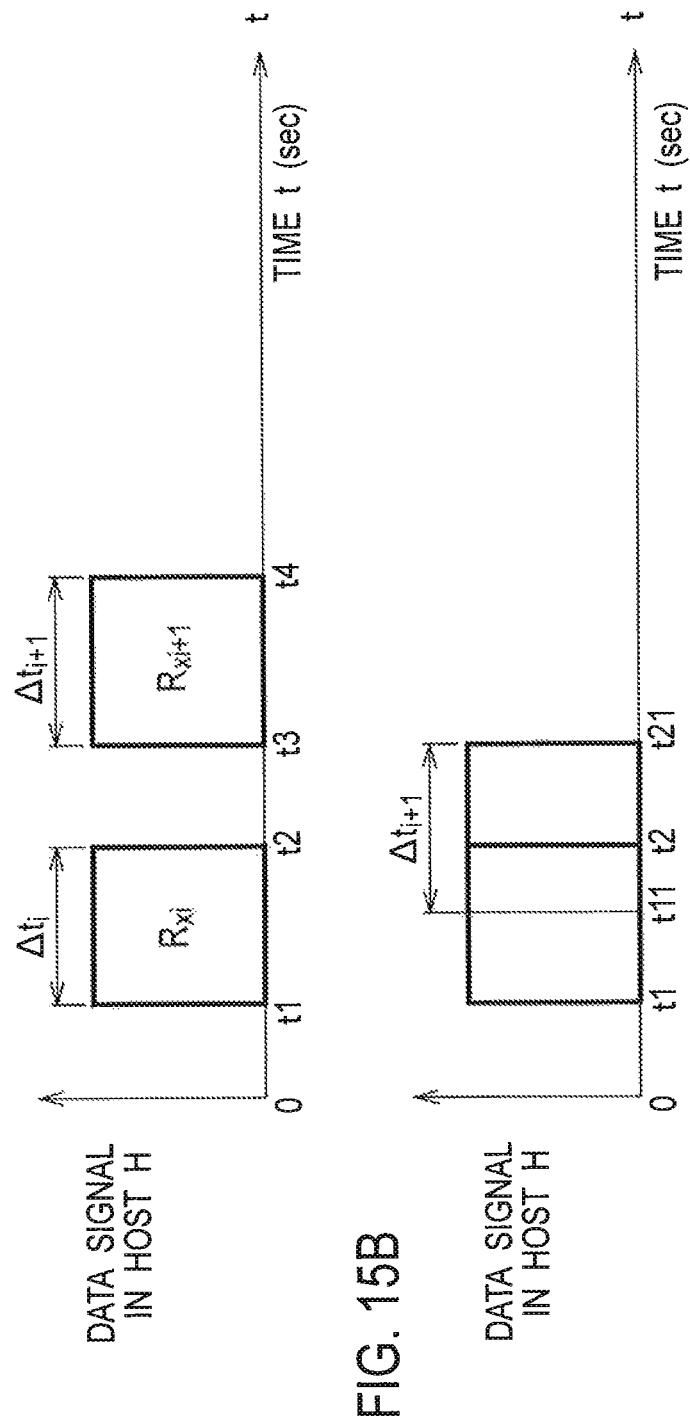

DATA SIGNAL IN SENSOR NODE P1

DATA SIGNAL IN SENSOR NODE P2

DATA SIGNAL IN SENSOR NODE Pn

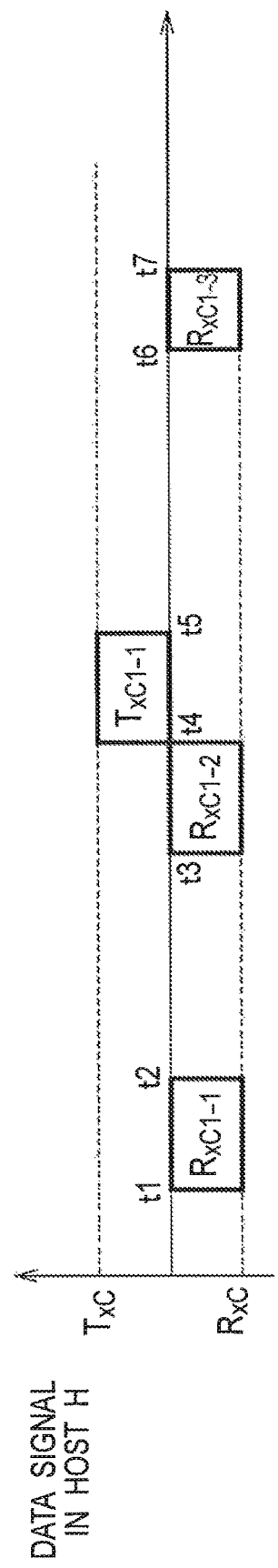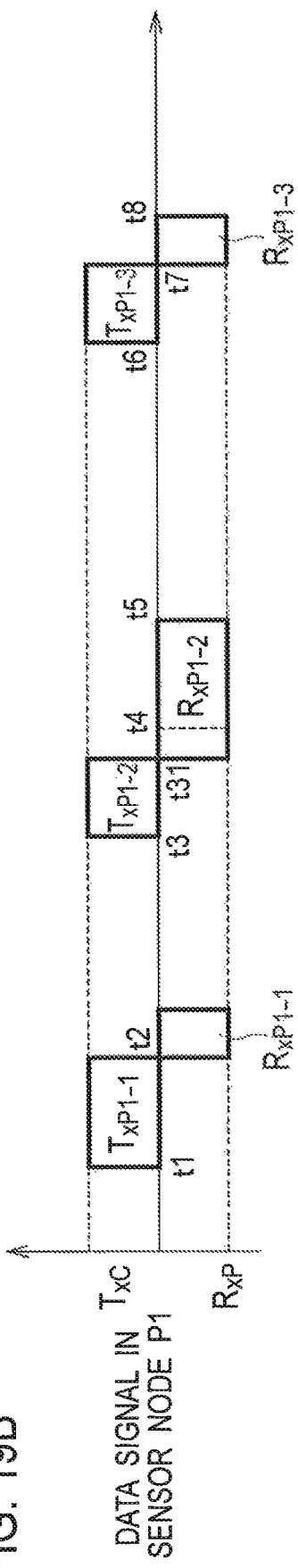
FIG. 19A DATA SIGNAL IN HOST H
FIG. 19B DATA SIGNAL IN SENSOR NODE P1

US 10,601,528 B2

COMMUNICATION TERMINAL AND WIRELESS SENSOR NETWORK SYSTEM

CROSS REFERENCE TO RELATED APPLICATIONS

This is a continuation application (CA) of PCT Application No. PCT/JP2015/54233, filed on Feb. 17, 2015, which claims priority to Japan Patent Application No. P2014-082131 filed on Apr. 11, 2014 and is based upon and claims the benefit of priority from prior Japanese Patent Applications No. P2014-082131 filed on Apr. 11, 2014 and PCT Application No. PCT/JP2015/54233, filed on Feb. 17, 2015, the entire contents of each of which are incorporated herein by reference.

FIELD

The embodiments described herein relate to a communication terminal and a wireless sensor network system.

BACKGROUND

There have been disclosed wireless sensor network systems (energy harvesting, a battery, etc.) configured to obtain electric power from various energy sources in a plurality of sensor nodes, and to execute unidirectionally or bidirectionally wireless data communications of the sensor information, e.g. switch information, temperature, pressure, with respect to hosts.

Over aging of social infrastructure systems, e.g. bridges, roads, railroad services, and buildings, have emerged as a social problem. Since enormous costs are required for countermeasures against over aging, countermeasures for prolonging a life of these social infrastructure systems are also required.

In conventional wireless sensor network systems, in order to maintain a state where a plurality of sensor nodes can constantly receive signals from a host after transmission of wireless transmission data is completed, it is necessary to constantly turn ON receivers in the plurality of the sensor nodes.

Moreover, in the conventional wireless sensor network systems, if sensor nodes contain not only a transmitting function but a receiving function, the receiving circuit had to be turned ON to keep a reception waiting mode always when its own sensor node do not execute transmission. Accordingly, power consumption is relatively large.

SUMMARY

The embodiments provide a communication terminal capable of executing a power saving communication, and a wireless sensor network system to which such a communication terminal can be applied.

According to one aspect of the embodiment, there is provided a sensor node communication terminal comprising: a sensor capable of collect sensor information at an installed location in autonomous timing; a control unit connected to the sensor, the control unit capable of executing calculation processing of the sensor information; a memory connected to the control unit; a wireless transmission/reception unit connected to the control unit; an antenna connected to the wireless transmission/reception unit, the antenna capable of wirelessly transmitting the sensor information or a result of the calculation processing of the sensor information; a power supply unit connected to the control unit; and a timer connected to the control unit, wherein second wireless transmission data can be received from a host side during only a predetermined time period after transmission of the first wireless transmission data is completed.

According to another aspect of the embodiment, there is provided a host communication terminal comprising: a control unit; a memory connected to the control unit; a wireless transmission/reception unit connected to the control unit; and an antenna connected to the wireless transmission/reception unit, wherein sensing data from a plurality of sensor nodes are collected through wireless communications, and change of a communication rate is specified with respect to the plurality of the sensor nodes in accordance with a received signal strength indication of a received electromagnetic wave.

According to still another aspect of the embodiment, there is provided a wireless sensor network system comprising: a plurality of sensor nodes; and a host capable of constantly or periodically receiving first wireless transmission data from the plurality of the sensor nodes, wherein the sensor node can receive second wireless transmission data from the host side during only a predetermined time period after transmission of the first wireless transmission data is completed.

According to the embodiments, there can be provided the communication terminal capable of executing the power saving communication, and the wireless sensor network system to which such a communication terminal can be applied.

BRIEF DESCRIPTION OF DRAWINGS

FIG. 6A is a schematic timing chart of a data signal in a sensor node Pi, in the wireless sensor network system to which the communication terminal according to the first embodiment can be applied.

FIG. 6B is a schematic timing chart of the data signal in a host H corresponding to FIG. 6A.

FIG. 7A is a detailed timing chart of the data signal in the sensor node Pi, in the wireless sensor network system to which the communication terminal according to the first embodiment can be applied.

FIG. 7B is a detailed timing chart of the data signal in a host H corresponding to FIG. 7A.

FIG. 15A is a schematic timing chart of received data in a host H in the case where there is no data collision, in a wireless sensor network system to which a communication terminal according to a third embodiment can be applied.

FIG. 15B is a schematic timing chart of a received data in the host H in the case where there is a data collision, as a comparative example.

FIG. 19A is a schematic timing chart of a data signal in a host H, in the wireless sensor network system to which the communication terminal according to the fourth embodiment can be applied.

FIG. 19B is a schematic timing chart of the data signal in a sensor node Pi corresponding to FIG. 19A.

DESCRIPTION OF EMBODIMENTS

Figure 1:
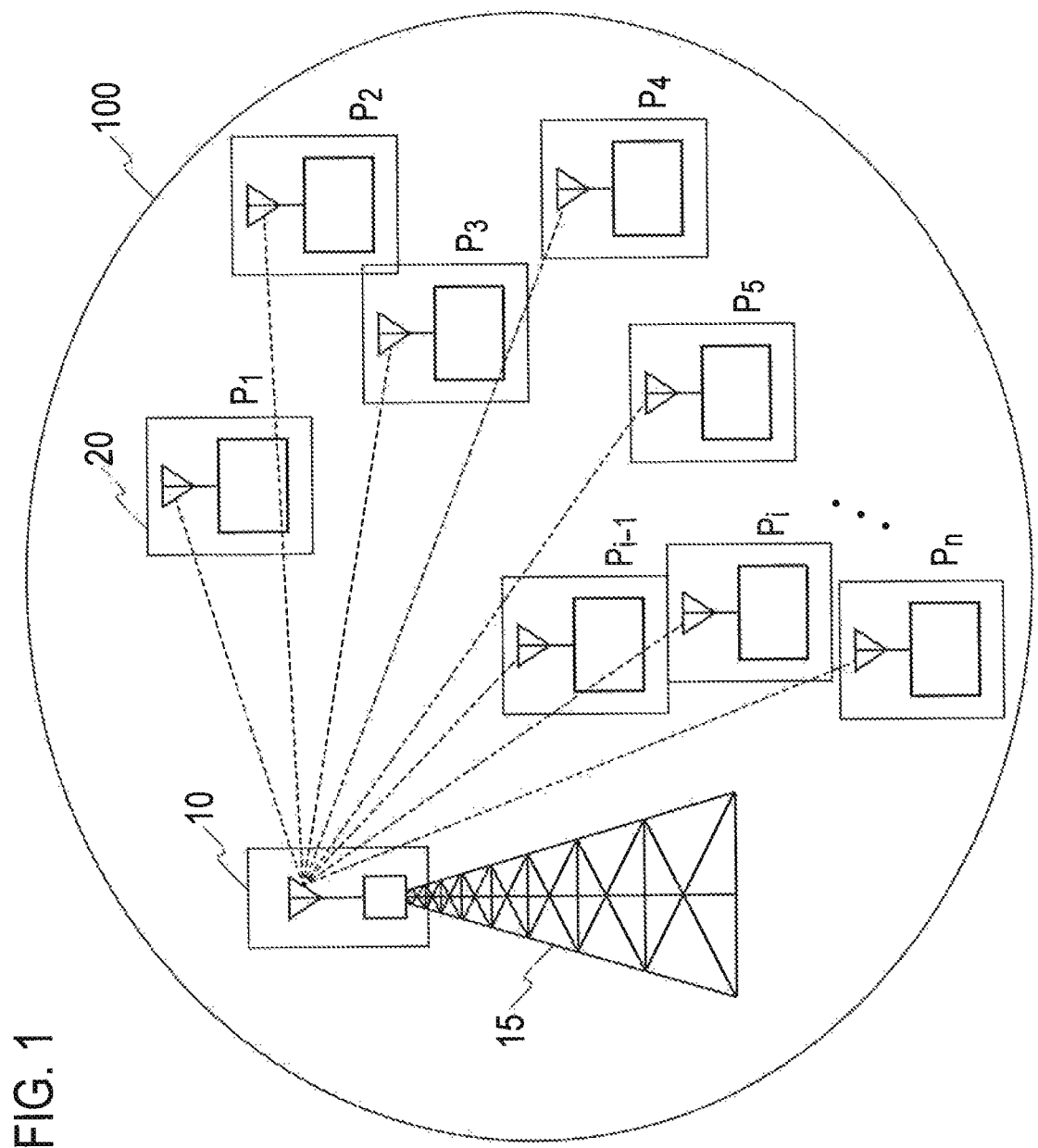
FIG. 1 is a schematic configuration diagram of a wireless sensor network system to which a communication terminal according to the first embodiment can be applied.

Next, certain embodiments will now be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiments shown hereinafter exemplify the apparatus and method for materializing the technical idea; and the embodiments do not intend to specify the material, shape, structure, placement, etc. of each component part as the following. The embodiments may be changed without departing from the spirit or scope of claims.

[First Embodiment]
(Wireless Sensor Network System)

FIG. 1 shows a schematic configuration of a wireless sensor network system 100 to which a communication terminal (sensor node) 20 according to the first embodiment can be applied.

As shown in FIG. 1, the wireless sensor network system 100 to which the communication terminal (sensor node) 20 according to the first embodiment can be applied includes: a plurality of sensor nodes 20 ($P_1, P_2, \ldots, P_i, P_{i+1}, \ldots, P_n$);

and a host 10 capable of constantly or periodically receiving first wireless transmission data from the plurality of the sensor nodes 20. In this case, a reception frequency in the host 10 when the host 10 periodically receives the data is more frequent than a transmission frequency of the sensor node 20.

The host 10 is a base station, and may be disposed on a support 15 having a predetermined height, for example.

The plurality of the sensor nodes 20 can receive second wireless transmission data from the host 10 side during only a predetermined short time period after transmission of the first wireless transmission data is completed, as mentioned below in explanation of FIG. 6. In this case, the first wireless transmission data are transmitted in predetermined timing from the plurality of the sensor nodes 20 ($P_1$, $P_2$, ..., $P_i$, $P_{i+1}$, ..., $P_n$) to the host 10.

Moreover, the second wireless transmission data is transmitted from the host 10 side to the plurality of the sensor nodes 20 ($P_1$, $P_2$, ..., $P_i$, $P_{i+1}$, ..., $P_n$) during only a predetermined short time period after transmission of the first wireless transmission data is completed.

Power consumption reduction of the wireless sensor network system 100 to which the communication terminal 20 according to the first embodiment can be applied can be realized by configuring so that the plurality of the sensor nodes 20 ($P_1$, $P_2$, ..., $P_i$, $P_{i+1}$, ..., $P_n$) can receive the transmitted data from the host 10 side during only the predetermined short time period after transmission of the wireless transmission data is completed. More specifically, the power consumption can be further reduced since there is no need of constantly turning ON the receiver in the plurality of the sensor nodes 20 ($P_1$, $P_2$, ..., $P_i$, $P_{i+1}$, ..., $P_n$) as compared with the case of capable of constantly receiving the transmitted data also after the transmission wireless transmission data is completed, in the plurality of the sensor nodes 20 ($P_1$, $P_2$, ..., $P_i$, $P_{i+1}$, ..., $P_n$).

Information collected in the host 10 can be supplied to a cloud computing system through the Internet line etc., and then can be integrally managed therein.

As mentioned below in explanation of FIG. 4B, the plurality of the sensor nodes 20 ($P_1$, $P_2$, ..., $P_i$, $P_{i+1}$, ..., $P_n$) include: a sensor 21 capable of collect sensor information at an installed location in autonomous timing; a memory 22 connected to the sensor 21; a control unit 24 connected to the memory 22, the control unit 24 capable of executing calculation processing of the sensor information; a wireless transmission/reception unit (RF) 26 connected to the control unit 24; an antenna 28 connected to the wireless transmission/reception unit 26, the antenna 28 capable of wirelessly transmitting the sensor information or a result of the calculation processing of the sensor information; a power supply unit 32 connected to the control unit 24; and a timer 30 connected to the control unit 24.

In this case, the sensor information obtained by the sensor 21 is stored in the memory 22.

The sensor information obtained in the sensor 21 includes optics, temperature, humidity, pressure, vibration, strain, inclination, switch information, etc., in accordance with a purpose of the wireless sensor network system 100 to which the communication terminal (sensor node) 20 is applied.

Energy harvesting apparatuses, e.g. solar panels, are mainly used for the power supply unit 32, for example. On the other hand, such an energy harvesting apparatus can be applied also to a structure of being replaced by batteries or being hybridly placed parallel thereto. This is because an objects, e.g. extension of life of batteries, are the same thereas.

(Wireless Sensor Network System for Bridges)

Figure 2:
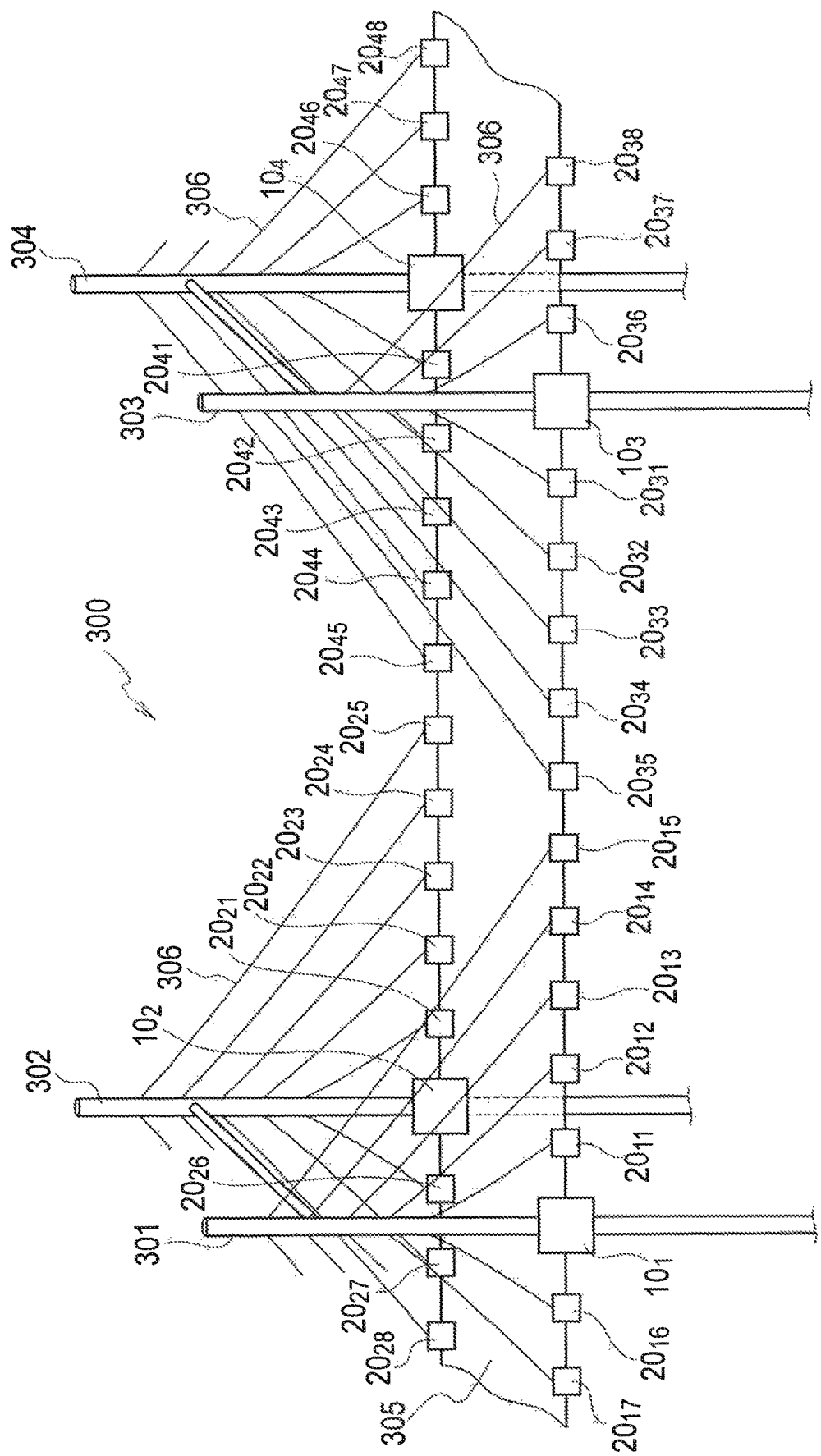
FIG. 2 is a schematic bird's-eye view configuration diagram of a wireless sensor network system for bridges as the wireless sensor network system to which the communication terminal according to the first embodiment can be applied.

FIG. 2 shows a schematic bird's-eye view configuration of a wireless sensor network system for bridges 300 as the wireless sensor network system to which the communication terminal (sensor node) 20 according to the first embodiment can be applied.

As shown in FIG. 2, the wireless sensor network system for bridges 300 to which the communication terminal (sensor node) 20 according to the first embodiment can be applied includes: a plurality of sensor nodes ($20_{11}$, $20_{12}$, ...), ($20_{21}$, $20_{22}$, ...), ($20_{31}$, $20_{32}$, ...) ($20_{41}$, $20_{42}$, ...); and hosts $10_1$, $10_2$, $10_3$, $10_4$ capable of constantly or periodically receiving first wireless transmission data transmitted from the plurality of the sensor nodes ($20_{11}$, $20_{12}$, ...), ($20_{21}$, $20_{22}$, ...), ($20_{31}$, $20_{32}$, ...) ($20_{41}$, $20_{42}$, ...). In this case, a reception frequency in the host 10 when the host 10 periodically receives the data is more frequent than a transmission frequency of the sensor node 20.

The hosts $10_1$, $10_2$, $10_3$, $10_4$ may be disposed on a connected portion between the supports 301, 302, 303, 304 having a predetermined height and a road (or railroad line) 305, for example.

A plurality of wires $30_6$ are connected between the supports 301, 302, 303, 304 and the road (or railroad line) 305, and thereby the road (or railroad line) 305 is supported by the supports 301, 302, 303, 304.

The plurality of the sensor nodes ($20_{11}$, $20_{12}$, ($20_{21}$, $20_{22}$, ...) ($20_{31}$, $20_{32}$, ...), ($20_{41}$, $20_{42}$, ...) may be disposed at connected portions between the plurality of the wires 306 and the roads (or railroad line) 305.

The plurality of the sensor nodes $20_{11}$, $20_{12}$, ... are capable of executing wireless transmission and reception to/from the host $10_1$, for example. Similarly, the plurality of the sensor nodes $20_{21}$, $20_{22}$, ... are capable of executing wireless transmission and reception to/from the host $10_2$; the plurality of the sensor nodes $20_{31}$, $20_{32}$, ... are capable of executing wireless transmission and reception to/from the host $10_3$; and the plurality of the sensor nodes $20_{41}$, $20_{42}$, ... are capable of executing wireless transmission and reception to/from the host $10_4$.

The plurality of the sensor nodes $20_{11}$, $20_{12}$, ... can receive the second wireless transmission data from the host $10_1$ side during only a predetermined short time period after transmission of the first wireless transmission data is completed. The first wireless transmission data is transmitted from the plurality of the sensor nodes $20_{11}$, $20_{12}$, ... to the host $10_1$ in predetermined timing. Moreover, the second wireless transmission data is transmitted from the host $10_1$ side to the plurality of the sensor nodes $20_{11}$, $20_{12}$, ... during only a predetermined short time period after transmission of the first wireless transmission data is completed. The same applies hereafter.

Power consumption reduction of the wireless sensor network system for bridges 300 to which the communication terminal 20 according to the first embodiment can be applied can be realized by configuring so that the plurality of the sensor nodes ($20_{11}$, $20_{12}$, ...) ($20_{21}$, $20_{22}$, ...) ($20_{31}$, $20_{32}$, ...) ($20_{41}$, $20_{42}$, can receive the transmitted data from the hosts $10_1$, $10_2$, $10_3$, $10_4$ side during only the predetermined short time period after transmission of the wireless transmission data is completed. That is, since there is no need to constantly turn ON the receivers in the plurality of the sensor nodes, the power consumption can be reduced.

Information collected in the hosts $10_1$, $10_2$, $10_3$, $10_4$ can be supplied to a cloud computing system through the Internet line etc., and then can be integrally managed therein.

In this case, as mentioned below in explanation of FIG. 4B, the plurality of the sensor nodes $(20_{11}, 20_{12}, \ldots)$, $(20_{21}, 20_{22}, \ldots)$, $(20_{31}, 20_{32}, \ldots)$, $(20_{41}, 20_{42}, \ldots)$ include: a sensor 21 capable of collect sensor information at an installed location in autonomous timing; a control unit 24 connected to the sensor 21, the control unit 24 capable of executing calculation processing of the sensor information; a memory 22 connected to the control unit 24; a wireless transmission/reception unit (RF) 26 connected to the control unit 24; an antenna 28 connected to the wireless transmission/reception unit 26, the antenna 28 capable of wirelessly transmitting the sensor information or a result of the calculation processing of the sensor information; a power supply unit 32 connected to the control unit 24; and a timer 30 connected to the control unit 24. In this case, the sensor information obtained by the sensor 21 is stored in the memory 22. The sensor information includes optics, temperature, humidity, pressure, vibration, strain, inclination, tension, etc., for example.

Energy harvesting apparatuses, e.g. solar panels, are mainly used for the power supply unit 32, for example. On the other hand, such an energy harvesting apparatus can be applied also to a structure of being replaced by batteries or being hybridly placed parallel thereto.

In addition, the sensor nodes disposed at a center neighborhood between the supports of the bridge may select any one of the hosts disposed at both sides, to execute the wireless transmission and reception therewith. Moreover, a method of avoiding a data collision may be applied thereto, as mentioned below in a third embodiment.

(Wireless Sensor Network System for Farms)

Figure 3:
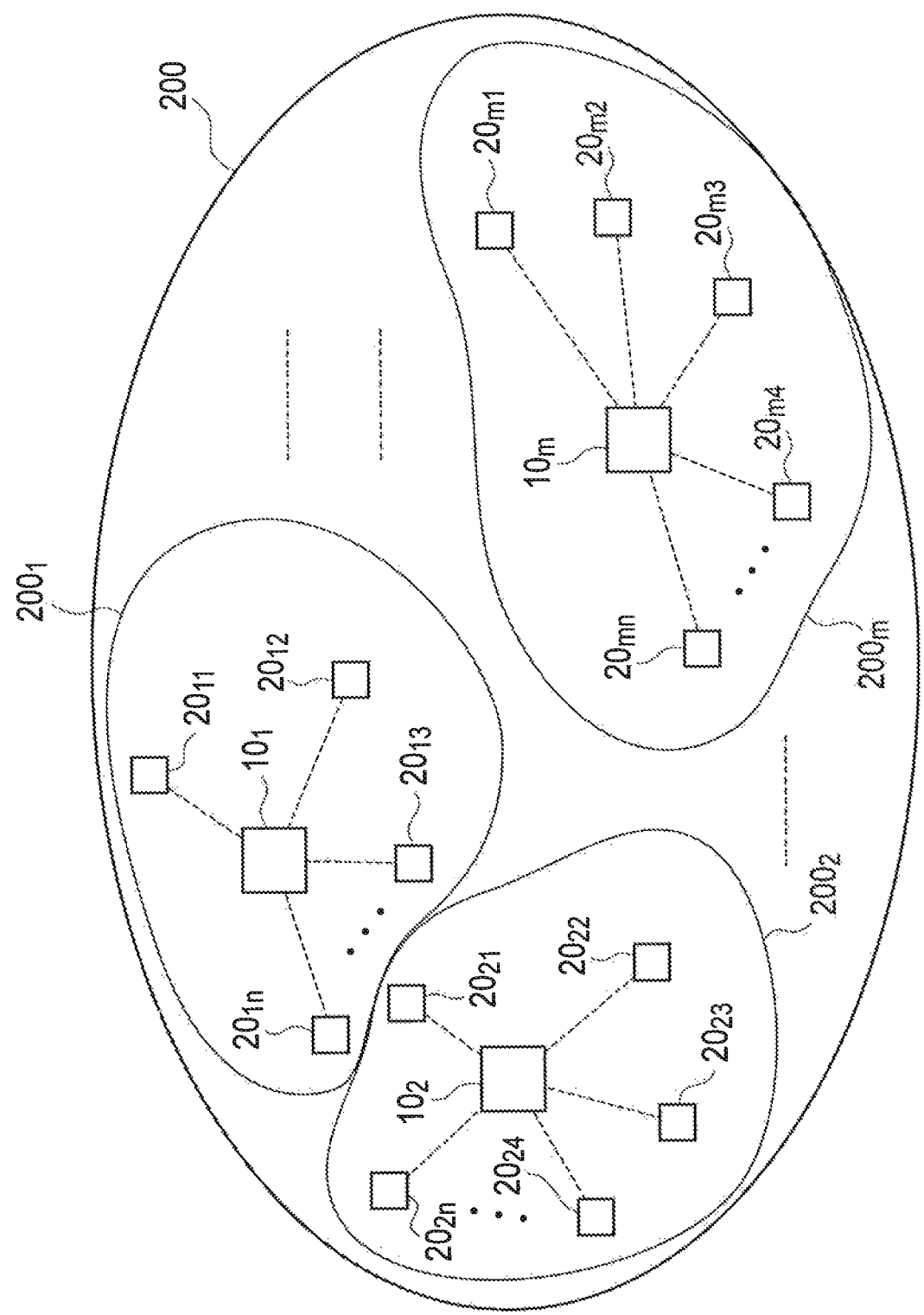
FIG. 3 is a schematic configuration diagram of a wireless sensor network system for farms as the wireless sensor network system to which the communication terminal according to the first embodiment can be applied.

FIG. 3 shows a schematic bird's-eye view configuration of a wireless sensor network system for farms 200 as the wireless sensor network system to which the communication terminal (sensor node) 20 according to the first embodiment can be applied. The wireless sensor network system for farms 200 may include a plurality of small-scaled wireless sensor network systems for farms $200_1, 200_2, \ldots, 200_m$, as shown in FIG. 3.

The plurality of the small-scaled wireless sensor network systems for farms $200_1, 200_2, \ldots, 200_m$ may be separated in the unit of crops to be cultivated, for example.

As shown in FIG. 3, the wireless sensor network system for farms 200 to which the communication terminal (sensor node) 20 according to the first embodiment can be applied includes: a plurality of sensor nodes $(20_{11}, 20_{12}, \ldots, 20_{1n})$, $(20_{21}, 20_{22}, \ldots, 20_{2n}), \ldots, (20_{m1}, 20_{m2}, \ldots, 20_{mn})$; and a plurality of hosts $10_1, 10_2, \ldots, 10_m$ capable of constantly or periodically receiving first wireless transmission data transmitted from the plurality of the sensor nodes $(20_{11}, 20_{12}, \ldots, 20_{1n})$, $(20_{21}, 20_{22}, \ldots, 20_{2n}), \ldots, (20_{m1}, 20_{m2}, \ldots, 20_{mn})$. In this case, a reception frequency in the host 10 when the host 10 periodically receives the data is more frequent than a transmission frequency of the sensor node 20.

The plurality of the sensor nodes $20_{11}, 20_{12}, \ldots, 20_{1n}$ are capable of executing wireless transmission and reception to/from the host $10_1$, for example. Similarly, the plurality of the sensor nodes $20_{21}, 20_{22}, \ldots, 20_{2n}$ are capable of executing wireless transmission and reception to/from the host $10_2$; and the plurality of the sensor nodes $20_{m1}, 20_{m2}, \ldots, 20_{mn}$ are capable of executing wireless transmission and reception to/from the host $10_m$.

The plurality of the sensor nodes $(20_{11}, 20_{12}, \ldots, 20_{1n})$, $(20_{21}, 20_{22}, \ldots, 20_{2n}), \ldots, (20_{m1}, 20_{m2}, \ldots, 20_{mn})$ respectively include sensors 21 for obtaining sensor information according to respective crops.

The plurality of the sensor nodes $20_{11}, 20_{12}, \ldots, 20_{1n}$ can receive the second wireless transmission data from the host $10_1$ side during only a predetermined short time period after transmission of the first wireless transmission data is completed. The first wireless transmission data is transmitted from the plurality of the sensor nodes $20_{11}, 20_{12}, \ldots, 20_{1n}$ to the host $10_1$ in predetermined timing. Moreover, the second wireless transmission data is transmitted from the host $10_1$ side to the plurality of the sensor nodes $20_{11}, 20_{12}, \ldots, 20_{1n}$ during only a predetermined short time period after transmission of the first wireless transmission data is completed. The same applies hereafter.

Information collected in the hosts $10_1, 10_2, 10_3, \ldots, 10_m$ can be supplied to a cloud computing system through the Internet line etc., and then can be integrally managed therein.

Power consumption reduction of the wireless sensor network system for farms 200 to which the communication terminal 20 according to the first embodiment can be applied can be realized by configuring so that the plurality of the sensor nodes $(20_{11}, 20_{12}, \ldots, 20_{1n})$, $(20_{21}, 20_{22}, \ldots, 20_{2n}), \ldots, (20_{m1}, 20_{m2}, \ldots, 20_{mn})$ can receive the transmitted data from the hosts $10_1, 10_2, \ldots, 10_m$ side during only the predetermined short time period after transmission of the wireless transmission data is completed. That is, since there is no need to constantly turn ON the receivers in the plurality of the sensor nodes, the power consumption can be reduced.

As mentioned below in explanation of FIG. 4B, the plurality of the sensor nodes $(20_{11}, 20_{12}, \ldots, 20_{1n})$, $(20_{21}, 20_{22}, \ldots, 20_{2n}), \ldots, (20_{m1}, 20_{m2}, \ldots, 20_{mn})$ include: a sensor 21 capable of collect sensor information at an installed location in autonomous timing; a control unit 24 connected to the sensor 21, the control unit 24 capable of executing calculation processing of the sensor information; a memory 22 connected to the control unit 24; a wireless transmission/reception unit (RF) 26 connected to the control unit 24; an antenna 28 connected to the wireless transmission/reception unit 26, the antenna 28 capable of wirelessly transmitting the sensor information or a result of the calculation processing of the sensor information; a power supply unit 32 connected to the control unit 24; and a timer 30 connected to the control unit 24. In this case, the sensor information obtained by the sensor 21 is stored in the memory 22. The sensor information includes optics, temperature, humidity, atmospheric pressure, vibration, strain, inclination, switch information, etc. in an installed location in the farm, for example.

Energy harvesting apparatuses, e.g. solar panels, are mainly used for the power supply unit 32, for example. On the other hand, such an energy harvesting apparatus can be applied also to a structure of being replaced by batteries or being hybridly placed parallel thereto.

(Communication Terminal: Host)

Figure 4A:
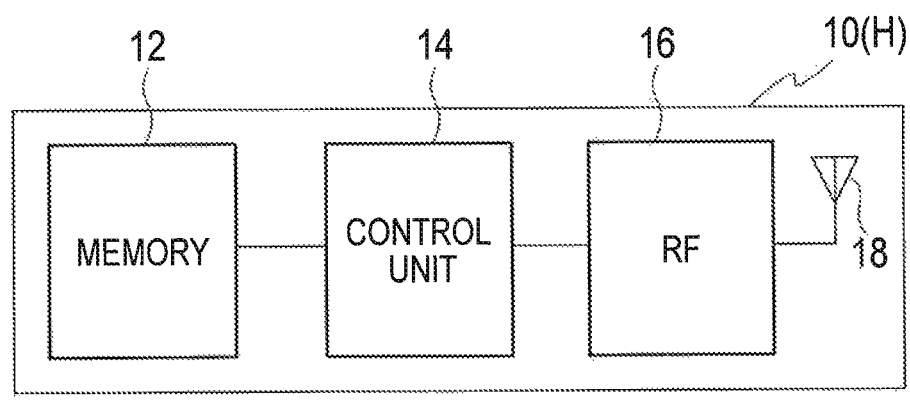
FIG. 4A is a schematic block configuration diagram of a host capable of executing wireless communications with a sensor node communication terminal according to the first embodiment.

As shown in FIG. 4A, a schematic block configuration of a host 10 (H) capable of executing wireless communications with the sensor node communication terminal according to the first embodiment includes: a memory 12; a control unit 14 connected to the memory 12; a wireless transmission/reception unit (RF) 16 connected to the control unit 14; and an antenna 18 connected to the wireless transmission/reception unit (RF) 16. Control information required for the wireless communications between the host 10 and the sensor node 20 is stored in the memory 12. The control unit 14 controls the wireless communications between the host 10 and the sensor node 20 on the basis of the control information stored in the memory 12. The wireless transmission/reception unit (RF) 16 transmits and receives wireless data between the host 10 and the sensor node 20 through the antenna 18. In this case, the host 10 (H) is a base station, and may include a power supply unit configuration for obtaining electric power from various energy sources (energy harvesting) as usage, not illustrated in FIG. 4A, since it is not necessary to particularly provide a power supply unit. The host 10 (H) can constantly or periodically receive first wireless transmission data from the sensor node 20 (P). In this case, a reception frequency in the host when the host periodically receives the data is more frequent than a transmission frequency of the sensor node.

(Communication Terminal: Sensor Node)

Figure 4B:
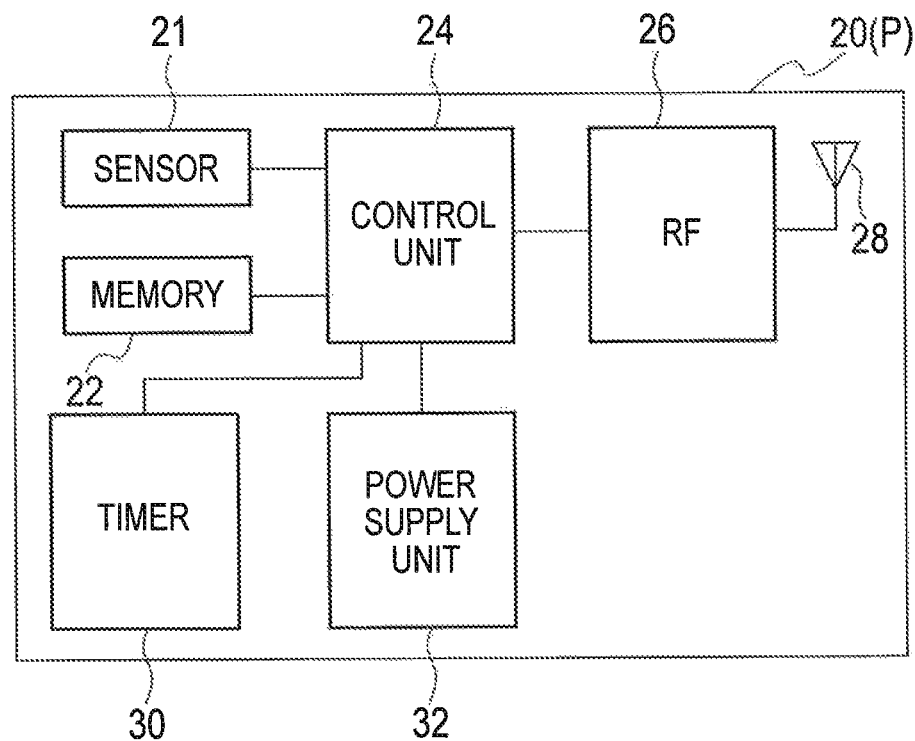
FIG. 4B is a schematic block configuration diagram of a sensor node functioning as the communication terminal according to the first embodiment.

On the other hand, as shown in FIG. 4B, a schematic block configuration of the sensor node 20 (P) functioning as the communication terminal according to the first embodiment includes: a sensor 21 capable of collect sensor information at an installed location in autonomous timing; a control unit 24 connected to the sensor 21, the control unit 24 capable of executing calculation processing of the sensor information; a memory 22 connected to the control unit 24; a wireless transmission/reception unit (RF) 26 connected to the control unit 24; an antenna 28 connected to the wireless transmission/reception unit 26, the antenna 28 capable of wirelessly transmitting the sensor information or a result of the calculation processing of the sensor information; a power supply unit 32 connected to the control unit 24; and a timer 30 connected to the control unit 24. The plurality of the sensor nodes 20 (P) can receive the transmission data from the host 10 side during only a predetermined short time period after transmission of the wireless transmission data is completed.

Power consumption reduction of the sensor node 20 (P) functioning as the communication terminal according to the first embodiment is realized by configuring so that the sensor node can receive the transmitted data from the host 10 side during only the predetermined short time period after transmission of the wireless transmission data is completed. That is, since there is no need to constantly turn ON a receiver in the sensor node 20 (P), the power consumption can be reduced.

In this case, the sensor information includes optics, temperature, humidity, pressure, vibration, strain, inclination, switch information, noise levels, etc., for example. That is, sensors capable of measuring various environment factors, e.g. a temperature sensor, a humidity sensor, a pressure sensor, a vibration sensor, a distortion sensor, an inclination sensor, and a switch information sensor, are applicable as the sensor 21.

The sensor information obtained by the sensor 21 is stored in the memory 22. Moreover, control information required for the wireless communications between the host 10 and the sensor node 20 is also stored in the memory 22.

The control unit 24 controls the wireless communications between the host 10 and the sensor node 20 on the basis of the sensor information and the control information stored in the memory 22. Moreover, the control unit 24 can execute calculation processing of the sensor information.

Moreover, the timer 30 is connected to the control unit 24, and can execute a timing control and time setting of the sensor node 20 (P).

The power supply unit 32 connected to the control unit 24 can obtain electric power from various energy sources, e.g. solar energy, vibrational energy of peripheral environments, wind energy, energy obtained from thermo-electric generating elements due to temperature variations (energy harvesting), as usage, e.g. opening/closings of switch, for example. The power supply unit 32 connected to the control unit 24 is preferable to eliminate battery exchange.

Energy harvesting apparatuses, e.g. solar panels, are mainly used for the power supply unit 32, for example. On the other hand, such an energy harvesting apparatus can be applied also to a structure of being replaced by batteries or being hybridly placed parallel thereto. This is because an objects, e.g. extension of life of batteries, are the same thereas.

(Sleep Period)

Figure 5:
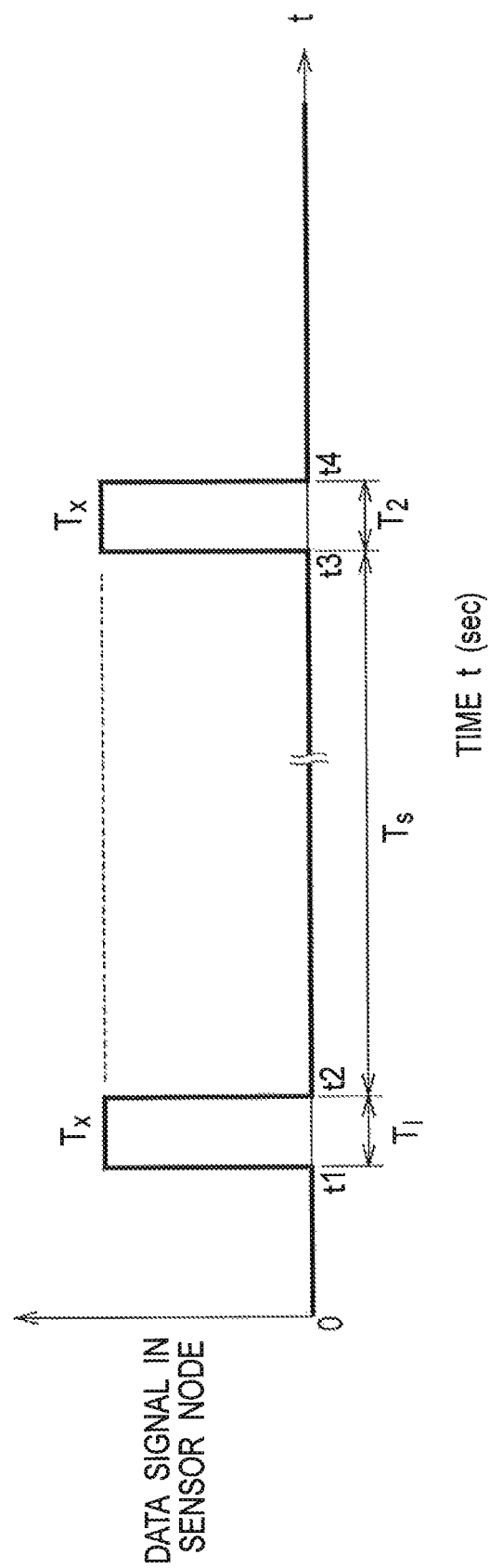
FIG. 5 is a schematic timing chart for explaining a sleep period Ts between transmitting data, in the sensor node functioning as the communication terminal according to the first embodiment.

FIG. 5 shows a schematic timing chart for explaining a sleep period Ts between two transmitting data $T_X$, in the sensor node 20 (P) functioning as the communication terminal according to the first embodiment.

As shown in FIG. 5, the sensor node 20 (P) functioning as the communication terminal according to the first embodiment can transmit the transmitting data $T_X$ to the host 10 (H), in the time width T2 between the timer time t3 and the timer time t4 after elapsing relatively long sleep time Ts, after transmitting the transmitting data $T_X$ to the host 10 (H) in the time width T1 between the timer time t1 and the timer time t2. More specifically, the sensor node 20 (P) can execute an intermittent sensing operation, and it is not necessary to constantly keep the receiver in the sensor node 20 (P) in the ON state after transmitting the transmitting data $T_X$ to the host 10 (H), and thereby can transmit the transmitting data $T_X$ to the host 10 (H) during only in the short time width T2 after elapsing of the sleep period Ts. Thereby, a power saving operation can be realized.

(Wireless Data Communications between Sensor Node and Host)

In the wireless sensor network system to which the communication terminal according to the first embodiment can be applied, FIG. 6A shows a schematic timing chart of a data signal in a sensor node Pi, and FIG. 6B shows a schematic timing chart of a data signal in a host H corresponding to FIG. 6A. As shown in a flow chart of FIG. 9 mentioned below, the timing chart of FIG. 6A corresponds to a type where a flag FLG is defined, and it is notified in advance with a value indicated by the flag FLG included in the transmitting whether or not the reception window period is provided following the transmission from the sensor node side to the host, on operation of the wireless communications between the sensor node Pi and the host H. Moreover, there is also operational mode without using the FLG, in FIG. 6A. In this case, as shown in the flow chart of FIG. 8 mentioned below, it corresponds to a type where there is no flag FLG, and a reception window period is always provided after transmission from the sensor node side to the host, on the operation of the wireless communications between the sensor node Pi and the host H.

Moreover, FIG. 7A shows a detailed timing chart of the data signal in the sensor node Pi, and FIG. 7B shows a detailed timing chart of the data signal in the host corresponding to FIG. 7A.

There are seven types of the following operational modes (A) to (G), in accordance whether the sensor node have the reception window period and whether the flag is included in the transmitting data, as a pattern of the transmission and reception. The case of not equipping the flag FLG therein corresponds to the following modes (A), (D), and (E), and the case of equipping the flag FLG therein corresponds to the following modes (B), (C), (F), and (G). Details will be mentioned below with reference to FIG. 7.

The case where the sensor node Pi does not equip the flag FLG in the wireless transmission data:

(A) A mode where the sensor node Pi provides a reception waiting time period after transmitting the wireless transmission data, but receives no data from the host H.
(D) A mode where the sensor node Pi provides the reception waiting time period after transmitting the wireless transmission data, and receives data (only a control signal) from the host H.
(E) A mode where the sensor node Pi provides the reception waiting time period after transmitting the wireless transmission data, and receives data (only a data request signal) from the host H, and then transmits data.

The case where the sensor node Pi equips the flag FLG in the wireless transmission data:
(B) A mode where the sensor node Pi does not provide the reception waiting time period after transmitting the wireless transmission data.
(C) A mode where the sensor node Pi provides a reception waiting time period after transmitting the wireless transmission data, but receives no data from the host H.
(F) A mode where the sensor node Pi provides the reception waiting time period after transmitting the wireless transmission data, and receives data (only a control signal) from the host H.
(G) A mode where the sensor node Pi provides the reception waiting time period after transmitting the wireless transmission data, and receives data (only a data request signal) from the host H, and then transmits data.

With reference to FIG. 7, patterns of the transmission and reception in the seven types of operational modes (A) to (G) will now be explained in detail.

As the patterns of the transmission and reception, there are seven types of the following operational modes (A) to (G):
(A) A mode where the sensor node Pi sets up a reception waiting time period $R_{Xi3}$ after transmitting the first wireless transmission data $T_{Xi3}$ but the host H does not transmit the second wireless transmission data $T_{Xh}$ to the sensor node Pi;
(B) A mode where the sensor node Pi does not set up the reception waiting time period $R_{Xi3}$ at the time of transmitting the first wireless transmission data $T_{Xi3}$, wherein the flag FLG=0.
(C) A mode where the sensor node Pi sets up a reception waiting time period $R_{Xi3}$ at the time of transmitting the first wireless transmission data $T_{Xi3}$ wherein the flag FLG=1, but the host H does not transmit the second wireless transmission data $T_{Xh}$ to the sensor node Pi.
(D) A mode where the sensor node Pi sets up a reception waiting time period $R_{Xi3}$ after transmitting the first wireless transmission data $T_{Xi3}$ and the host H does not transmit the second wireless transmission data $T_{Xh}$ to the sensor node P wherein the second wireless transmission data $T_{Xh}$ is a control signal.
(E) A mode where the sensor node Pi sets up a reception waiting time period $R_{Xi3}$ after transmitting the first wireless transmission data $T_{Xi3}$ and the host H does not transmit the second wireless transmission data $T_{Xh}$ to the sensor node Pi, wherein the second wireless transmission data $T_{Xh}$ is a request signal (data request signal), and then the sensor node Pi transmits third wireless transmission data $T_{Xi4}$ to the host H. An amount of the data/the number of times of transmitting are specified by a content of the data request signal.
(F) A mode where the sensor node Pi sets up a reception waiting time period $R_{Xi3}$ at the time of transmitting the first wireless transmission data $T_{Xi3}$ wherein the flag FLG=1, and the host H does not transmit the second wireless transmission data $T_{Xh}$ to the sensor node Pi, wherein the second wireless transmission data $T_{Xh}$ is a control signal.
(G) A mode where the sensor node Pi sets up a reception waiting time period $R_{Xi3}$ at the time of transmitting the first wireless transmission data $T_{Xi3}$ wherein the flag FLG=1, and the host H does not transmit the second wireless transmission data $T_{Xh}$ to the sensor node Pi, wherein the second wireless transmission data $T_{Xh}$ is a request signal (data request signal), and then the sensor node Pi transmits third wireless transmission data $T_{Xi4}$ to the host H. The third wireless transmission data $T_{Xi4}$ includes the flag FLG, and such a pattern will be repeated hereinafter.

The flag FLG is included in data currently transmitted, and indicates whether or not a window period for reception during a predetermined time period is set up at the sensor node Pi side after this transmission. More specifically, if the flag FLG=1 in the first wireless transmission data $T_{Xi3}$ and then the reception waiting time period $R_{Xi3}$ opens. Then, the host side which receives the aforementioned flag FLG to be interpreted transmits the second wireless transmission data TXh during the reception waiting time period $R_{Xi3}$, if required.

If no transmission from the host H to the sensor node Pi is required, the host sides transmits no data during the time period of the reception waiting time period $R_{Xi3}$. Of course, if the reception waiting time period $R_{Xi3}$ is not set up followed by the first wireless transmission data $T_{Xi3}$ the flag FLG is set to 0 in the first wireless transmission data $T_{Xi3}$ in order to notify the host H side that the sensor node Pi does not receive data in this time.

There are mainly the following two types of data, in the data ($T_{Xh}$=($R_{Xh}$ if the sensor node receives)) transmitted during the reception waiting time period $R_{Xi3}$. More specifically, two types of data are signals including: (1) a request signal for transmitting a certain specified data from the host H side to the sensor node Pi; and (2) a control signal to be transmitted from the host H side to the sensor node Pi (e.g., system time information, a synchronous signal, a certain operational-mode transition signal, etc.).

If the data ($T_{Xh}$=($R_{Xh}$ if the sensor node receives)) transmitted thereto during the reception waiting time period $R_{Xi3}$ is a control signal to be transmitted from the host H side to the sensor node Pi, the sensor node side executes operation in accordance with the received control signal. More specifically, for example, the sensor node side H receives time information of the host to be synchronized with a clock in the sensor node.

If the data ($T_{Xh}$=($R_{Xh}$ if the sensor node receives)) transmitted thereto during the reception waiting time period $R_{Xi3}$ is a request signal for transmitting a certain specified data from the host H side to the sensor node Pi, the data etc. specified by the host H is transmitted in a predetermined timing (t6 in FIG. 7) after the reception waiting time period $R_{Xi3}$ (third wireless transmission data $T_{Xi4}$).

It is configured so that it is indicated whether the reception window period is provided in the sensor node Pi side following by the third wireless transmission data $T_{X\pm4}$ by providing the flag FLG=1/0 in a predetermined location in the third wireless transmission data $T_{X\pm4}$ for example, as shown in FIG. 7A.

Although the flag FLG is provided during the third wireless transmission data $T_{Xi4}$ in the example shown in FIG. 7A, such providing of the flag can be omitted if the maximum number of times of the data, such as the third wireless transmission data $T_{Xi4}$, is systemically determined.

Of course, as shown in FIG. 7A, if the system is arranged so that the reception window period is always provided after the first wireless transmission data $T_{Xi3}$ the flag FLG is omissible. However, in this case, it is necessary to provide the reception window period at every transmission. Accordingly, it is effective to utilize the flag FLG since the sensor node side can be operated to power saving if the number of times of providing the reception window period is reduced.

In this case, the first wireless transmission data $T_{Xi3}$ is transmitted from the sensor node 20 ($P_i$) to the host 10 (H) in a predetermined timing. Moreover, the first wireless transmission data $T_{Xi3}$ is transmitted from the host 10 (H) side to the sensor node 20 ($P_i$) in a predetermined few time period after transmitting the second wireless transmission data $T_{Xh}$ is completed.

A plurality of factors may be compounded to be determined as determination factors (e.g., once in five times during daytime, only at midnight during the night, etc.) for determining whether or not the sensor node 20 ($P_i$) continuously executes the reception waiting.

At least one of the determination factors for determining whether or not the sensor node 20 ($P_i$) should continuously execute the reception waiting may be time or information equivalent to time.

Moreover, at least one of the determination factors for determining whether or not the sensor node 20 ($P_i$) should continuously execute the reception waiting may be information regarding the number of times. For example, it is also possible to open the reception window only once in five times, or to open the reception window only once a day, as usage. Thus, the reception windows $R_{Xi2}$, $R_{Xi3}$ etc. may not be opened each time in accordance with the flag FLG indicating whether or not the sensor node 20 ($P_i$) continuously executes the reception waiting.

Moreover, at least one of the determination factors for determining whether or not the sensor node 20 ($P_i$) should continuously execute the reception waiting may be information regarding a matching determination result between the collected information and a determination criterion previously determined.

Moreover, at least one of the determination factors for determining whether or not the sensor node 20 ($P_i$) should continuously execute the reception waiting may be information regarding a matching determination result between the collected information in addition to the information collected until now and a determination criterion previously determined.

As a result, power-saving of the communication terminal according to the first embodiment and the wireless sensor network system to which such a communication terminal can be applied can be realized.

In the wireless sensor network system to which the communication terminal according to the first embodiment can be applied, the sensor node turns ON the receiving circuit "at each time" during a few time period after the transmission. Accordingly, the host side always recognizes a timing for transmitting data to the sensor node, the sensor node can receive the data if the data is transmitted in such timing.

In the wireless sensor network system to which the communication terminal according to the first embodiment can be applied, the power consumption at the side of the sensor node can be reduced since it is not always necessary to turn ON the receiving circuit in the sensor node but it is necessary to turn ON the receiving circuit only a certain limited time period. However, although the timing for transmitting the data from the host side is limited, a delay of such a level is permissible.

In the wireless sensor network system to which the communication terminal according to the first embodiment can be applied, the flag FLG information included in the last transmitting signal indicates whether or not the sensor node turns ON the receiving circuit during a few time period after the transmission, the receiving circuit is turned ON during the few time period only in the case of turning "ON". That is, since it is not turned ON each time, power consumption can further be reduced. However, although the timing for transmitting data from the host side is further limited, an interval of which the reception window is opened generally becomes wide.

Figure 8:
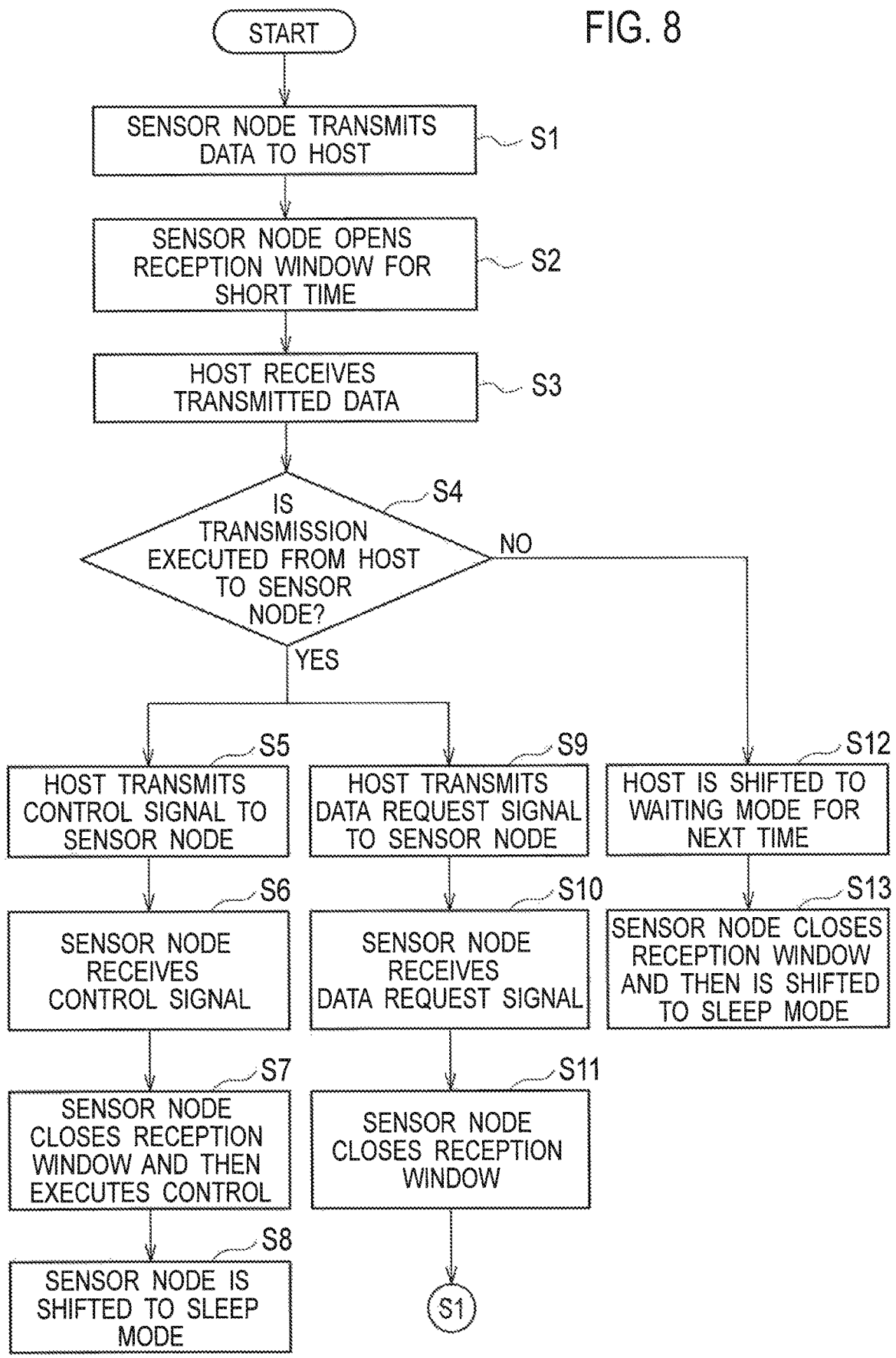
FIG. 8 is an operation flow chart of wireless communications between the sensor node Pi and the host H, in the wireless sensor network system to which the communication terminal according to the first embodiment can be applied (type where there is no flag FLG, and a reception window period is always provided after transmission from the sensor node side to the host).

FIG. 8 shows an operation flow chart of the wireless communications executed between the sensor node Pi and the host H (ta type where there is no flag FLG, and a reception window period is always provided after transmission from the sensor node side to the host), in the wireless sensor network system to which the communication terminal according to the first embodiment can be applied.

Figure 9:
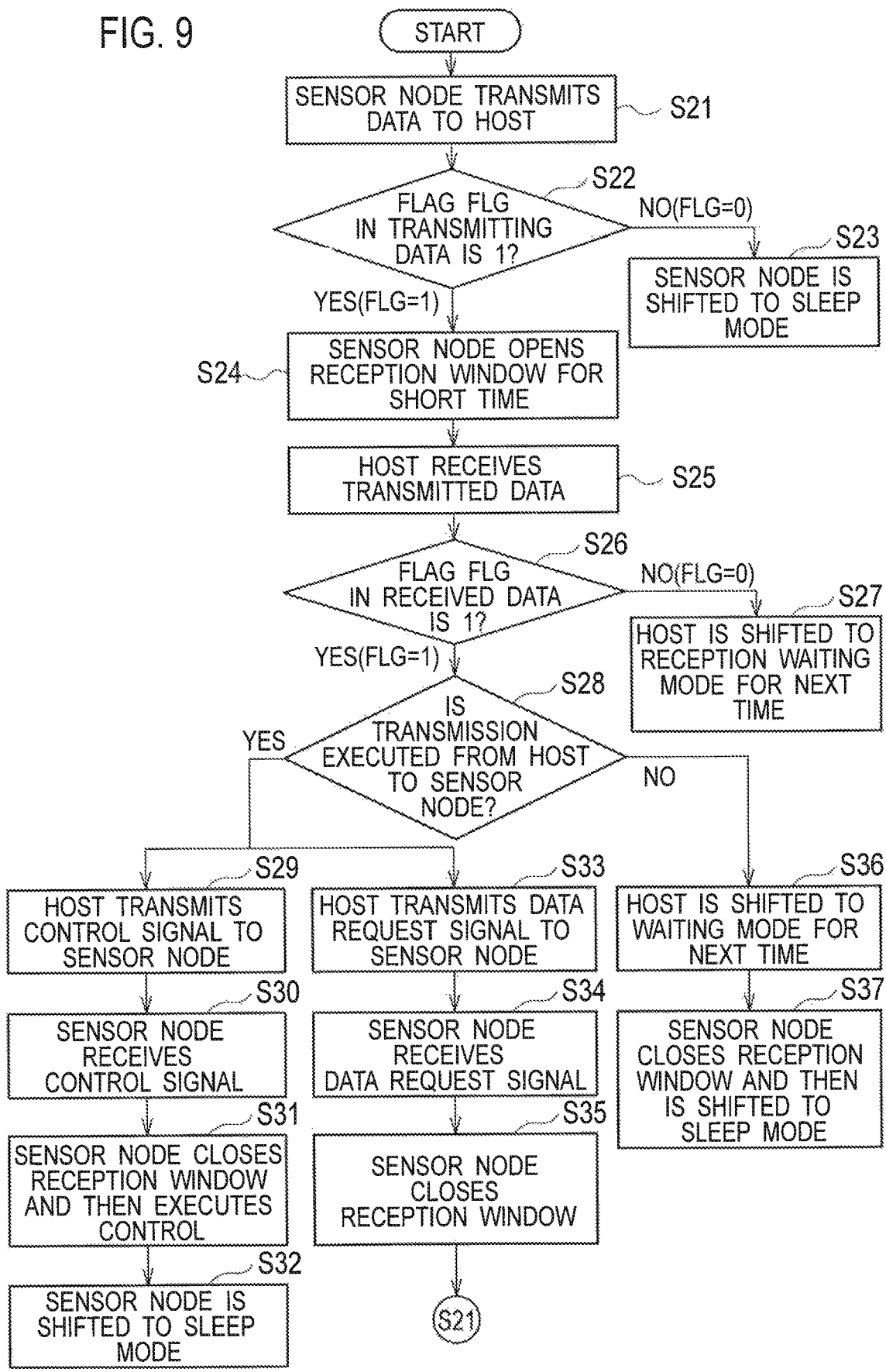
FIG. 9 is an operation flow chart of wireless communications between the sensor node Pi and the host H, in the wireless sensor network system to which the communication terminal according to the first embodiment can be applied (type where a flag FLG is defined, and it is notified in advance with a value indicated by the flag FLG included in the transmitting whether or not the reception window period is provided following the transmission from the sensor node side to the host).

FIG. 9 shows an operation flow chart of the wireless communications executed between the sensor node Pi and the host H (a type where a flag FLG is defined, and it is notified in advance with a value indicated by the flag FLG included in the transmitting whether or not the reception window period is provided following the transmission from the sensor node side to the host), in the wireless sensor network system to which the communication terminal according to the first embodiment can be applied.

There are the following two types in the wireless sensor network systems to which the communication terminal according to the first embodiment can be applied: i.e., the type where there is no flag FLG, and a reception window period is always provided after transmission from the sensor node side to the host (corresponding to the operation flowchart of FIG. 8); and the type where a flag FLG is defined, and it is notified in advance with a value indicated by the flag FLG included in the transmitting whether or not the reception window period is provided following the transmission from the sensor node side to the host (corresponding to the operation flow chart of FIG. 9).

The type where there is no flag FLG, and a reception window period is always provided after transmission from the sensor node side to the host has a time period (although it is a few time period) when the receiving circuit is always turned ON for every transmission at the side of the sensor node. Accordingly, what is necessary is just to not each time but sometimes turn ON the receiving circuit (e.g., once in ten times, once in one day, once in five times only when a stored volume of power generation energy is equal to or greater than a predetermined level, etc.) (Thinning Reception). On the other hand, there is a feature that the power consumption can be reduced rather than by the type where a flag FLG is defined and it is notified in advance with a value indicated by the flag FLG included in the transmitting whether or not the reception window period is provided following the transmission from the sensor node side to the host.

(Type where there is No Flag FLG, and Reception Window Period is Always Provided after Transmitting to Host)

In the wireless sensor network system to which the communication terminal according to the first embodiment can be applied, there is shown an operation flow of a type where there is no flag FLG, and a reception window period is always provided after transmission from the sensor node side to the host, as follows:

(a) In Step S1 in FIG. 8, firstly, the sensor node transmits data to the host.

(b) Next, in Step S2, the sensor node opens the reception window for a short time.

(c) Next, in Step S3, the host receives the transmitted data.

(d) Next, in Step S4, it is determined whether or not transmission is executed from the host to the sensor node.
(e) Next, if a result of the determination in Step S4 is NO, the process is shifted to Step S12 and then the host is shifted to a waiting mode for next time.
(f) Further, the process is shifted to Step S13, and then the sensor node closes the reception window and then is shifted to a sleep mode. (The sensor node executes a timer count etc. until next time.)
(g) On the other hand, if the result of the determination in Step S4 is YES, the process is shifted to Step S5 and then the host transmits a control signal to the sensor node.
(h) Next, in Step S6, the sensor node receives the control signal.
(i) Next, in Step S7, the sensor node closes the reception window and then executes control.
(j) Next, in Step S8, the sensor node is shifted to the sleep mode. (The sensor node executes a timer count etc. until next time.)
(k) Moreover, if the result of the determination in Step S4 is YES, the process is also shifted to Step S9 and then the host transmits a data request signal to the sensor node.
(l) Next, in Step S10, the sensor node receives the data request signal.
(m) Next, in Step S11, the sensor node closes the reception window, and then the process returns to Step S1 and the sensor node transmits data to the host.

(Type where there is Flag FLG and it is Notified in Advance with Flag FLG Whether Reception Window Period is Provided)

In the wireless sensor network system to which the communication terminal according to the first embodiment can be applied, there is shown an operation flow of the type where the flag FLG is defined, and it is notified in advance with a value indicated by the flag FLG included in the transmitting whether or not the reception window period is provided following the transmission from the sensor node side to the host, as follows:

(a) In Step S21 in FIG. 9, firstly, the sensor node transmits data to the host.
(b) Next, in Step S22, it is determined whether the flag FLG included in the transmitted data is 1.
(c) If a result of the determination in Step S22 is NO (FLG=0), the process is shifted to Step S23 and then the sensor node is shifted to a sleep mode. (The sensor node executes a timer count etc. until next time.)
(d) If the result of the determination in Step S22 is YES (FLG=1), the process is shifted to Step S24 and then the sensor node opens a reception window for a short time.
(e) Next, in Step S25, the host receives the transmitted data.
(f) Next, in Step S26, it is determined whether the flag FLG included in the received data is 1.
(g) If a result of the determination in Step S26 is NO (FLG=0), the process is shifted to Step S27 and then the host is shifted to a reception waiting mode for next time.
(h) On the other hand, if the result of the determination in Step S26 is YES (FLG=1), the process is shifted to Step S28 and then it is determined whether or not the transmission is executed from the host to the sensor node.
(i) Next, if the result of the determination in Step S28 is YES, the process is shifted to Step S29 and then the host transmits a control signal to the sensor node.
(j) Next, in Step S30, the sensor node receives the control signal.
(k) Next, in Step S31, the sensor node closes the reception window and then executes control.
(l) Next, in Step S32, the sensor node is shifted to the sleep mode. (The sensor node executes a timer count etc. until next time.)
(m) On the other hand, if the result of the determination in Step S28 is YES, the process may be shifted to Step S33 and then the host may transmit a data request signal to the sensor node.
(n) Next, in Step S34, the sensor node receives the data request signal.
(o) Next, in Step S35, the sensor node closes the reception window.
(p) Next, the process returns to Step S21 and then the sensor node transmits the data to the host.
(q) On the other hand, if the result of the determination in Step S28 is NO, the process is shifted to Step S36 and then the host is shifted to a waiting mode for next time.
(r) Next, the process is shifted to Step S37, and then the sensor node closes the reception window and then is shifted to a sleep mode. (The sensor node executes a timer count etc. until next time.)

Used frequency bands applicable to the communication terminal according to the first embodiment and the wireless sensor network system to which a plurality of the communication terminals can be applied are ML7396A: 915 MHz to 929.7 MHz; ML7396B: 902 MHz to 928 MHz; ML7396E: 863 MHz to 870 MHz, etc., for example. As a modulation method, binary—(G)FSK/MSK etc. are applicable, for example. Moreover, data communication rates may support 50 kbps/100 kbps/200 kbps, IEEE standard, for example. Moreover, a data communication rate of 400 kbps can also applied thereto. Transmission outputs are 20 mW/10 mW/1 mW, for example, and receiving sensitivities are approximately −100 dBm to approximately −70 dBm, for example.

According to the first embodiment, there can be provided the communication terminal capable of executing the power saving communication, and the wireless sensor network system to which such a communication terminal can be applied.

[Second Embodiment]

Figure 10:
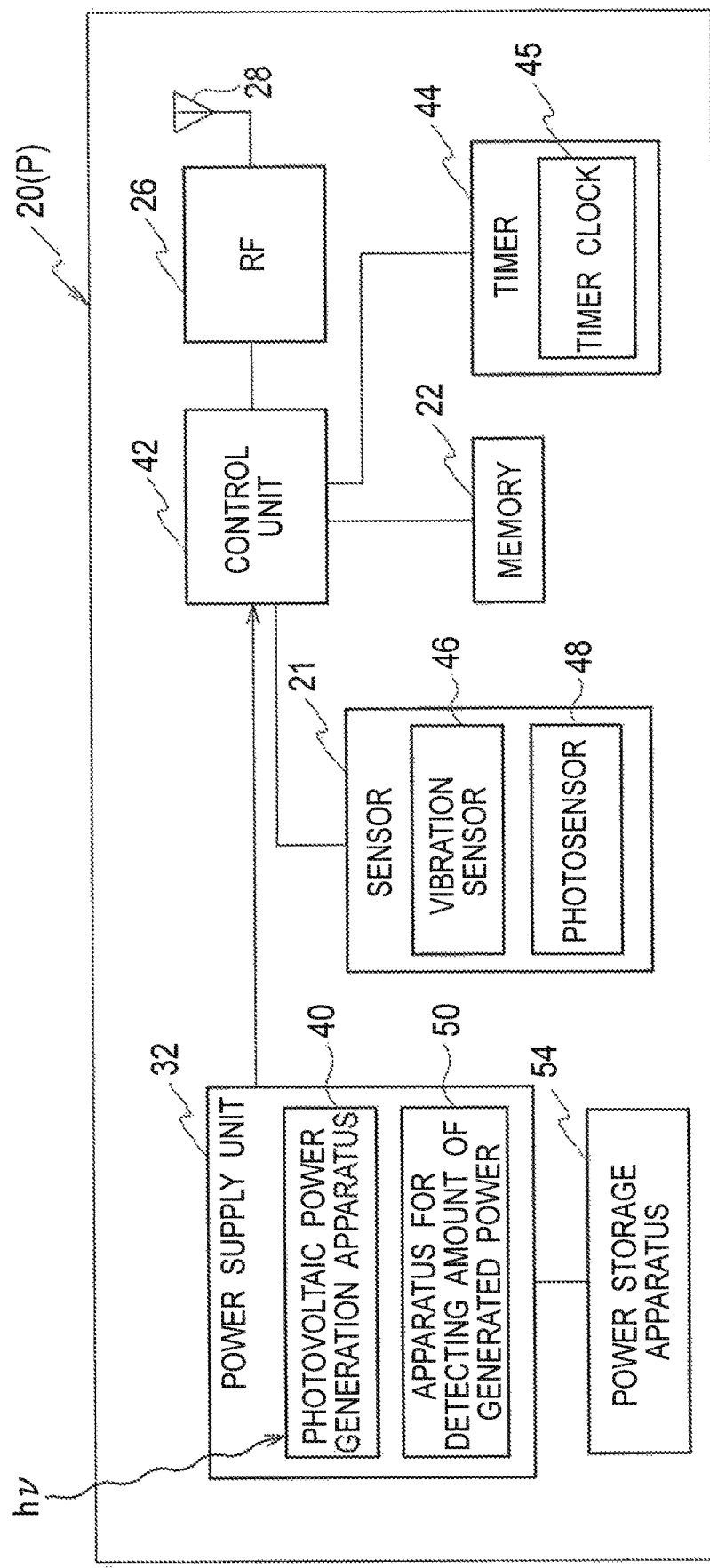
FIG. 10 is a schematic block configuration diagram of a sensor node, including a photovoltaic generation apparatus, which is a sensor node communication terminal according to a second embodiment.

FIG. 10 shows a schematic block configuration of a sensor node 20, including a photovoltaic generation apparatus 40 (P), which is a sensor node 20 (P) functioning as a communication terminal according to a second embodiment.

As shown in FIG. 10, a schematic block configuration of the sensor node 20 (P) functioning as the communication terminal according to the second embodiment includes: a sensor 21 capable of collect sensor information at an installed location in autonomous timing; a control unit 42 connected to the sensor 21, the control unit 42 capable of executing calculation processing of the sensor information; a memory 22 connected to the control unit 42; a wireless transmission/reception unit (RF) 26 connected to the control unit 42; an antenna 28 connected to the wireless transmission/reception unit 26, the antenna 28 capable of wirelessly transmitting the sensor information or a result of the calculation processing of the sensor information; a power supply unit 32 connected to the control unit 42; and a timer 44 connected to the control unit 42. The plurality of the sensor nodes 20 (P) can receive the transmission data from the host 10 side during only a predetermined short time period after transmission of the wireless transmission data is completed.

The power supply unit 32 includes: a photovoltaic generation apparatus 40; and an apparatus 50 for detecting amount of generated power connected to the photovoltaic generation apparatus 40, the apparatus 50 for detecting amount of generated power configured to measure an amount of photovoltaic generated power. The apparatus 50 for detecting amount of generated power configured to measure the amount of the photovoltaic generated power may include a peak-power tracking function. Moreover, a power storage apparatus 54 may be connected to the power supply unit 32. Capacitors, lithium ion capacitors, Electric Double-Layer Capacitors (EDLCs), etc. are applicable to the power storage apparatus 54. In addition, the power storage apparatus 54 may be contained in the power supply unit 32.

Energy harvesting apparatuses, e.g. solar panels, are mainly used for the power supply unit 32, for example. On the other hand, such an energy harvesting apparatus can be applied also to a structure of being replaced by batteries or being hybridly placed parallel thereto. This is because an objects, e.g. extension of life of batteries, are the same thereas.

The power supply unit 32 connected to the control unit 42 include a photovoltaic generation apparatus 40, and thereby can obtain electric power from solar energy (energy harvesting). The power supply unit 32 connected to the control unit 42 is preferable to eliminate battery exchange.

Although the sensor 21 includes a vibration sensor 46 and a photosensor 48, but it is not limited to such a configuration. In this case, the sensor information includes optics, temperature, humidity, pressure, vibration, strain, inclination, switch information, noise levels, etc., for example. That is, sensors capable of measuring various environment factors, e.g. a photosensor, a temperature sensor, a humidity sensor, a pressure sensor, a vibration sensor, a distortion sensor, an inclination sensor, and a switch information sensor, are applicable as the sensor 21. In this case, an acceleration sensor etc. formed of a Micro Electro Mechanical Systems (MEMS) element etc. are applicable to the vibration sensor, as usage.

The sensor information obtained by the sensor 21 is stored in the memory 22. Moreover, control information required for the wireless communications between the host 10 and the sensor node 20 is also stored in the memory 22.

The control unit 42 controls the wireless communications between the host 10 and the sensor node 20 on the basis of the sensor information and the control information stored in the memory 22. Moreover, the control unit 42 can execute calculation processing of the sensor information.

Moreover, the timer 44 is connected to the control unit 42, and can execute a timing control and time setting of the sensor node 20 (P).

The timer 44 can supply information sources related to an operation timing of the communication terminal according to the second embodiment and the wireless sensor network system to which the communication terminal is applied.

The sensor node 20 (P) functioning as the communication terminal according to the second embodiment may include a timer clock 45 for executing a substantially time adjustment of the timer 44 when the timer 44 is largely different from a phase of the day due to certain causes (misoperation, fallibleness (large time lag), being initialized, being stopped or restarted, etc.), for example.

In the sensor node 20 (P) functioning as the communication terminal according to the second embodiment, a timer clock 45 using a photosensor 49 may be contained in the timer 44, for example.

Figure 11:
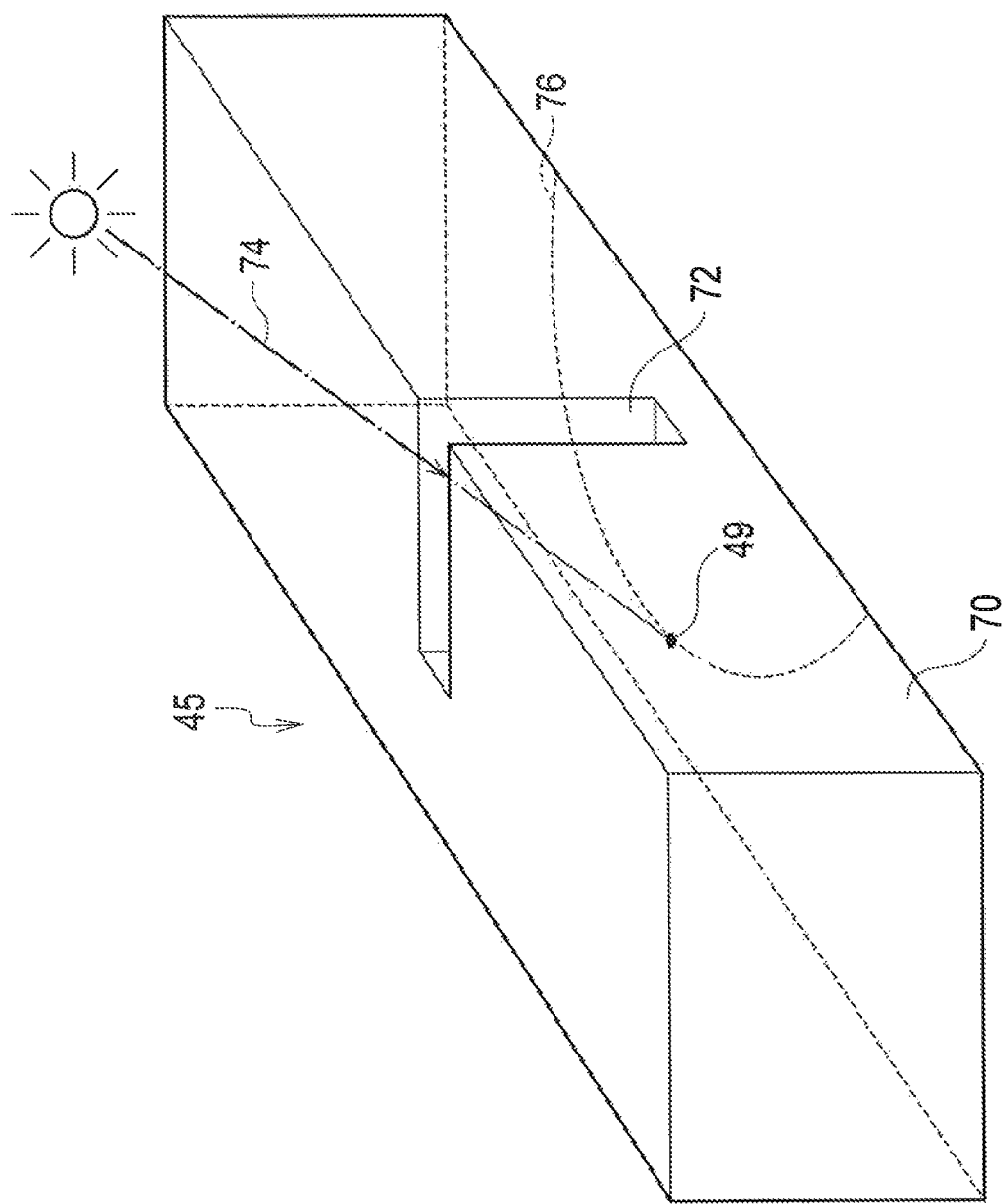
FIG. 11 is a schematic bird's-eye view configuration diagram of a timer clock using a photosensor applicable to the sensor node communication terminal according to the second embodiment.

As shown in FIG. 11, the timer clock 45 includes: a housing 70; a slit window portion 72 formed in the housing 70; and a photosensor 49 disposed in a substantially center portion on a trajectory 76 on a bottom of the housing 70 drawn by a solar light 74 passing through a slit window portion 72. In this case, the photosensor 49 disposed in the timer clock 45 may be used in common for the photosensor 48.

The timer clock 45 applicable to the sensor node 20 (P) utilizes the photosensor 49, and can set up an output peak point or center point of time of the photosensor 49 as a substantial noon, in the same principle as solar clocks. By including such a timer clock 45, time used as a reference of the timer 44 can be reset also in a situation where an absolute time is disappeared. Moreover, if a photovoltaic power generation is not used, the time of day can be estimated using an output of the photosensor 49 by observing a cycle of the intensity of light on the day.

Figure 12A:
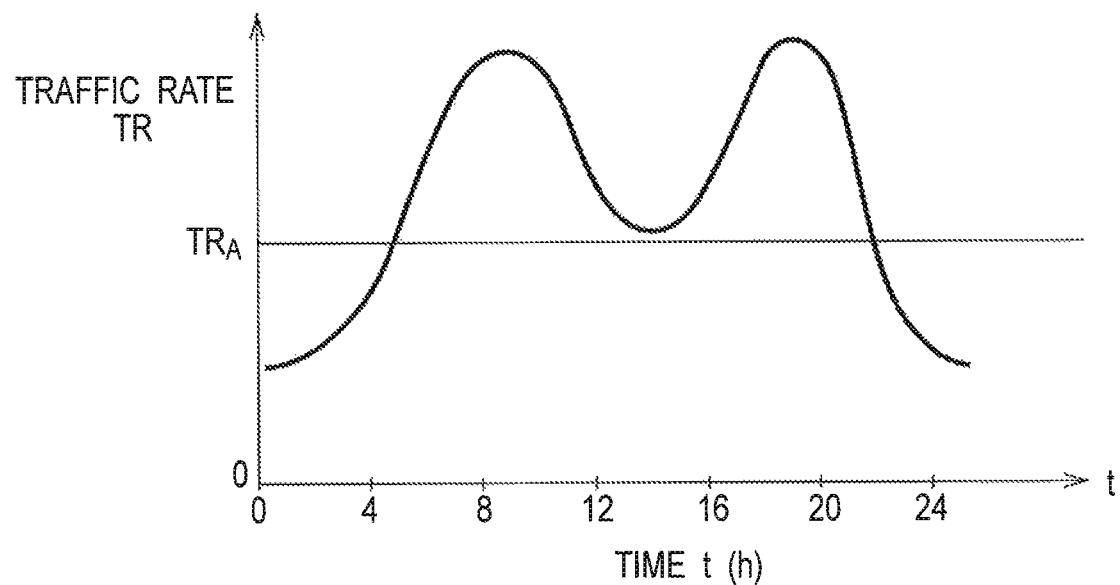
FIG. 12A is a schematic diagram showing a relationship between a traffic rate TR and time t (h), in a vibration sensor applicable to the sensor node communication terminal according to the second embodiment.

FIG. 12A schematically shows a relationship between a traffic rate TR measured by the vibration sensor 46 and time period t (h), in the sensor node communication terminal according to the second embodiment. For example, when the sensor node communication terminal according to the second embodiment is applied to wireless sensor network systems for bridges etc., it is assumed that the relationship between the traffic rate TR corresponding to traffic of automobiles or railroad services and the time period t (h) is detected by the vibration sensor 46, as sensor information. An average of the traffic rate TR is expressed with $TR_A$ herein.

Supposing that traffic is measured by the vibration sensor 46 (load sensors with respect to bridges, etc. may also be used), the time of day is estimated by grasping a rule of tendencies, e.g. traffic in one day, in this assumption. That is, it is assumed that there is observed a tendency that traffic is heavy during morning and evening commuter hours, but traffic during midnight is lighter that traffic during daytime even in the time period between them, etc. It is assumed that patterns on Saturdays, Sundays and national holidays are different therefrom. In the case of bridges for railroad services, it is assumed that a first train after elapsing equal to or greater than a certain predetermined time corresponds to 4:45 at a time of the first train, etc. Note that the characteristics shown in FIG. 12A are merely schematic.

Figure 12B:
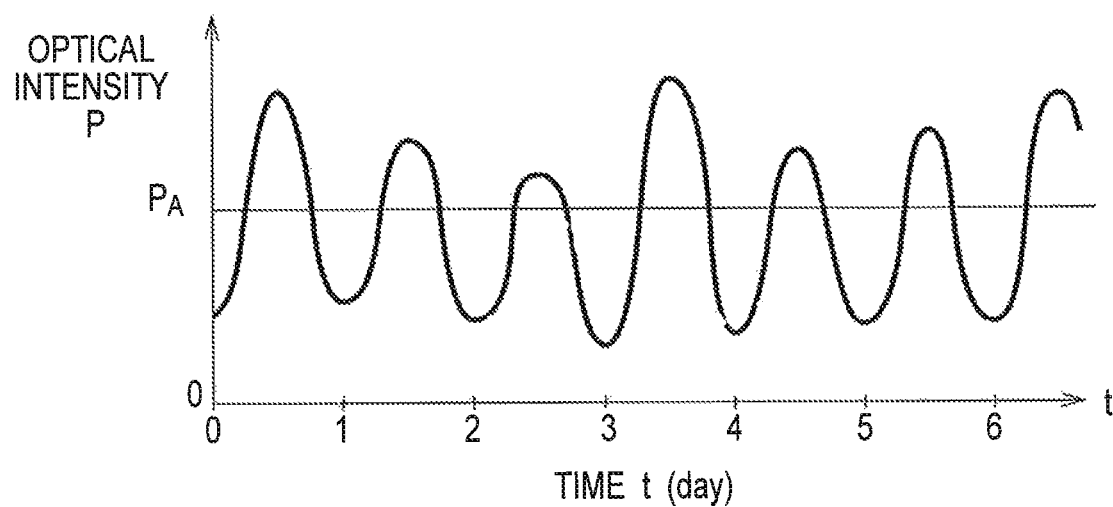
FIG. 12B is a schematic diagram showing a relationship between an optical intensity P and time t (day), in the photosensor applicable to the sensor node communication terminal according to the second embodiment.

FIG. 12B schematically shows a relationship between an optical intensity P measured by the photosensor 48 and time period t (day), in the sensor node communication terminal according to the second embodiment. For example, when the sensor node communication terminal according to the second embodiment is applied to wireless sensor network systems for farms etc., it is assumed that the photosensor 48 detects the relationship between the optical intensity P equivalent to daylight hours corresponding to a cycle of one day, and the time period t (day), as sensor information. An average of the optical intensity P is expressed with $P_A$ herein. Note that the characteristics shown in FIG. 12B are merely schematic.

Figure 13:
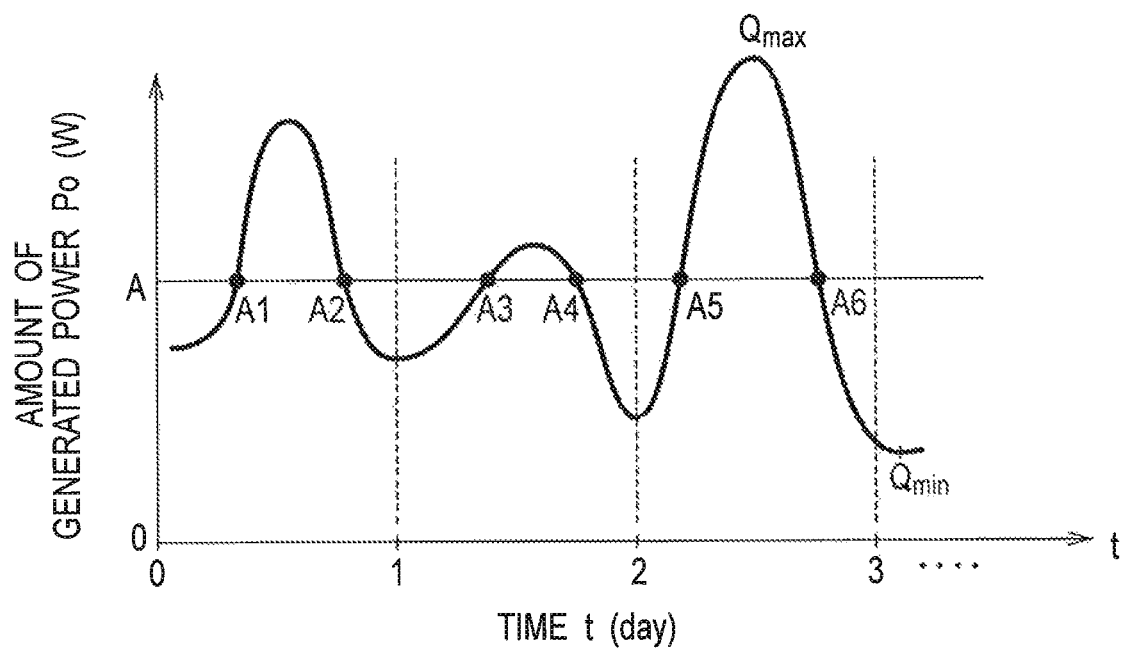
FIG. 13 is a schematic diagram showing a relationship between an amount of generated power $P_O$ of a photovoltaic generation apparatus and time t (day), in the sensor node communication terminal according to the second embodiment.

FIG. 13 schematically shows a relationship between an amount of generated power $P_O$ of the photovoltaic generation apparatus 40 and time period t (day), in the sensor node 20 (P) functioning as the communication terminal according to the second embodiment.

There is shown a variation of the amount of the generated power $P_O$ in the photovoltaic generation apparatus 40 according to an amount of received light of the solar light (day) with respect to the time period t, in the sensor node 20 (P) functioning as the communication terminal according to the second embodiment. The time of the timer 44 can be adjusted by the timer clock 45 in any one of timings: when the amount of the generated power $P_O$ exceeds a reference value A (corresponding to operational points A1, A3, and A5); when the amount of the generated power $P_O$ is lower than the reference value A (corresponding to operational points A2, A4, and A6); when the amount of the generated power $P_O$ indicates a maximum amount of the generated power (corresponding to an operational point Qmax); and when the amount of generated power $P_O$ indicates a minimum amount of the generated power (corresponding to an operational point Qmin).

The basic algorithm is an algorithm assuming that: the point A of the normal amount of the generated power $P_O$ is a point where the amount of the generated power is decreased (i.e., a point near the sunrise or sunset); and a midpoint between A1 and A2, a midpoint between A3 and A4, and a midpoint between A5 and A6 are noon (midday). That is, a difference between the upper limit and the lower limit of each day is relatively small since dark levels are approximately uniform during the night, but a difference therebetween occurs in accordance with the weather etc. in the daytime. Since various complicated factors, e.g. variations of the weather in one day, variations of season, etc., are assumed, it is also possible to perceived that such timing is noon by observing the timings of Qmax for several days, in the light of fluctuation etc. It is effective also to use an equation (Qmax+Qmin)/2, or Qmin+(Qmax−Qmin)×coefficient, etc., as a method of deriving the reference value A (determination level). Regardless of whether filters, e.g. moving average, is applied or is not applied thereto, it is assumed that daily value A will be varied.

In this case, regarding setting of the reference value A, the reference value A may be set up so as to be a hysteresis relationship. That is, a value calculated with the values of the maximum amount of the generated power MAX and the minimum amount of generated power MIN can be used as the reference value A, for example. Alternatively, the reference value A may be set up by calculating an adjustment value with the standard deviation of the amount of the generated power $P_O$ during the past several days.

Power consumption reduction of the sensor node 20 (P) functioning as the communication terminal according to the second embodiment is realized by configuring so that the sensor node can receive the transmitted data from the host 10 side during only the predetermined short time period after transmission of the wireless transmission data is completed. That is, since there is no need to constantly turn ON a receiver in the sensor node 20 (P), the power consumption can be reduced.

The communication terminal according to the second embodiment and the wireless sensor network system to which such a communication terminal can be applied can operate in the same manner as the communication terminal according to the first embodiment and the wireless sensor network system to which the communication terminal can be applied. Moreover, the wireless sensor network system according to the second embodiment is applicable as the wireless sensor network system for bridges or the wireless sensor network system for farms in the same manner as that of the first embodiment.

According to the second embodiment, there can be provided the communication terminal capable of time resetting and capable of executing the power saving communication, and the wireless sensor network system to which such a communication terminal can be applied.

[Third Embodiment]

For example, a plurality of sensor nodes installed to structures, e.g. a bridge, collect various kinds of sensor information in the construction location, e.g. vibration, strain, inclination, and temperature, and are required that the various kinds of sensor information should be collected at the substantially same time. Moreover, the various kinds of the sensor information collected at the substantially same time are transmitted to one host to be analyzed, through wireless communications. In this case, in a method of executing the wireless transmission of at substantially equivalent interval from the plurality of the sensor nodes after collection of the various kinds of the sensor information, wireless signal data is collided with one another, and thereby a case where the communications are not realized may also occur.

Figure 14A:
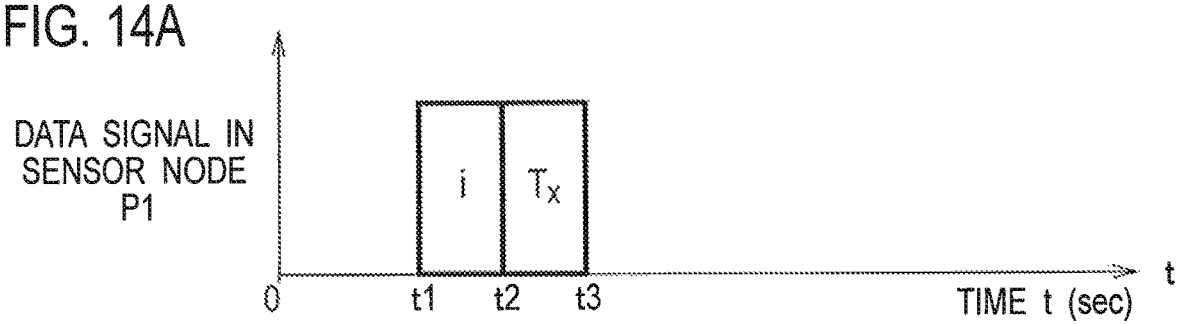
FIG. 14A is a schematic timing chart of a data signal in a sensor node P1, in a wireless sensor network system to which a communication terminal according to a comparative example can be applied.
Figure 14B:
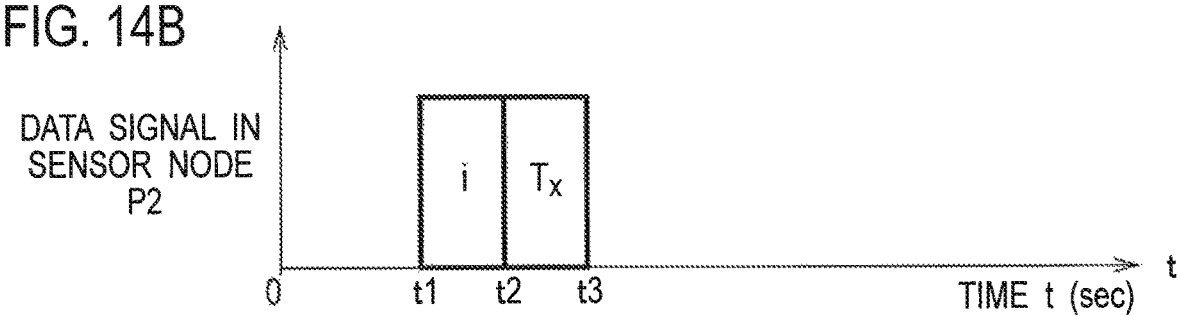
FIG. 14B is a schematic timing chart of a data signal in a sensor node P2, in the wireless sensor network system to which the communication terminal according to the comparative example can be applied.
Figure 14C:
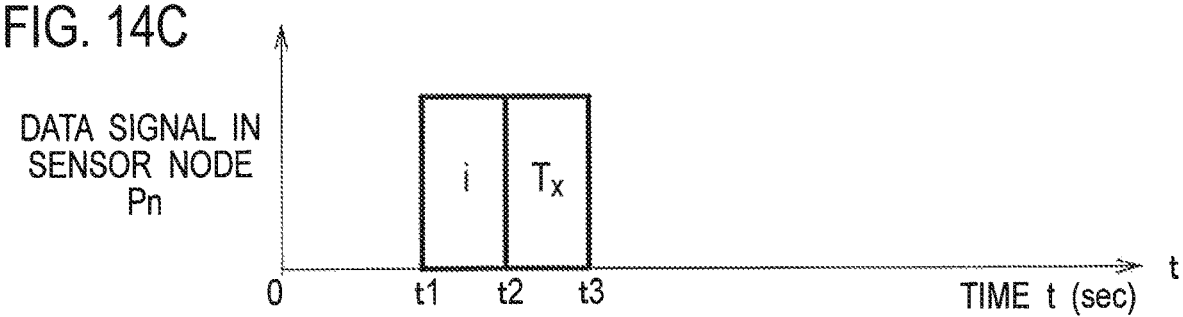
FIG. 14C is a schematic timing chart of a data signal in a sensor node Pn, in the wireless sensor network system to which the communication terminal according to the comparative example can be applied.

FIG. 14A is a schematic timing chart of a data signal in a sensor node P1, in a wireless sensor network system to which a communication terminal according to a comparative example can be applied. FIG. 14A is a schematic timing chart of a data signal in a sensor node P1, in a wireless sensor network system to which a communication terminal according to a comparative example can be applied. FIG. 14B shows a schematic timing chart of a data signal in a sensor node P2, and FIG. 14C shows a schematic timing chart of a data signal in a sensor node Pn.

FIG. 15A is a schematic timing chart of received data in a host H in the case where there is no data collision, in a wireless sensor network system to which a communication terminal according to the third embodiment can be applied. FIG. 15B is a schematic timing chart of a received data in the host H in the case where there is a data collision, as a comparative example.

Figure 16A:
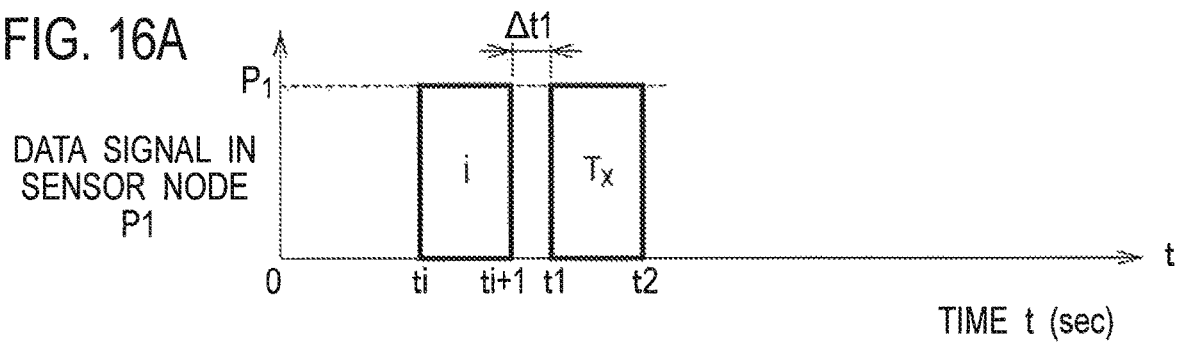
FIG. 16A is a schematic timing chart of a data signal in a sensor node P1, in the wireless sensor network system to which the communication terminal according to the third embodiment can be applied.

FIG. 16A is a schematic timing chart of a data signal in the sensor node P1, in the wireless sensor network system to which the communication terminal according to the third embodiment can be applied. FIG. 16 shows a schematic timing chart of the data signal in the sensor node P2, and FIG. 16C shows a schematic timing chart of the data signal in the sensor node Pn.

Figure 16B:
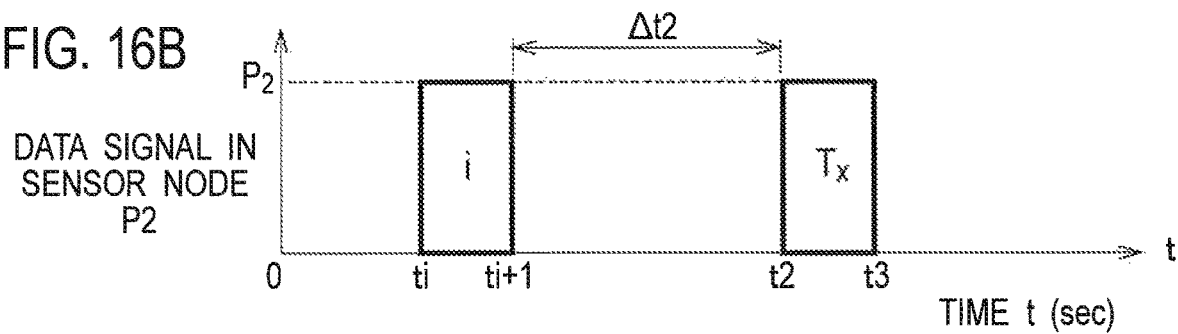
FIG. 16B is a schematic timing chart of a data signal in a sensor node P2, in the wireless sensor network system to which the communication terminal according to the third embodiment can be applied.

In the sensor node P1, as shown in FIG. 16A, various kinds of sensor information i collected during time ti to time $t_{i+1}$ are transmitted to the host H during time t1 to time t2 after the elapse of timing Δt1 from time ti+1. In the sensor node P2, as shown in FIG. 16B, various kinds of sensor information i collected during time ti to time ti+1 are transmitted to the host H during time t2 to time t3 after the elapse of timing Δt2 from time ti+1. In the sensor node Pn, as shown in FIG. 16C, various kinds of sensor information i collected during time ti to time ti+1 are transmitted to the host H during time tn to time tn+1 after the elapse of timing Δtn from time ti+1.

Figure 16C:
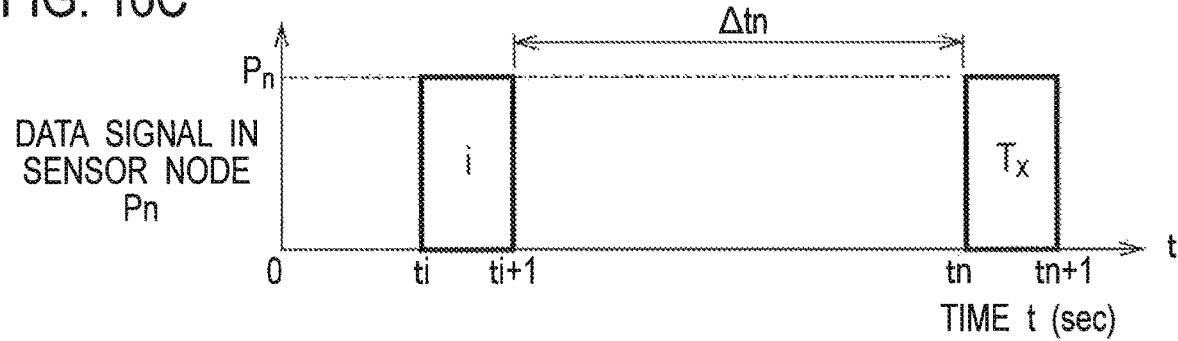
FIG. 16C is a schematic timing chart of a data signal in a sensor node Pn, in the wireless sensor network system to which the communication terminal according to the third embodiment can be applied.

More specifically, in the wireless sensor network system to which the communication terminal according to the third embodiment can be applied, as shown in FIGS. 16A to 16C, when the various kinds of sensor information i collected by the plurality of the sensor nodes P1, P2, . . . , Pn during the substantially same times ti to ti+1 are transmitted to the host H through the wireless communications, the timings from the collection of the various kinds of sensor information i to the transmission to the host H through the wireless communications can be changed among the plurality of the sensor nodes P1, P2, . . . , Pn, and thereby a collision of the wireless signal data can be avoided, in the plurality of sensor nodes P1, P2, . . . , Pn.

In this case, the timing Δt changed among the plurality of the sensor nodes P1, P2, . . . , Pn may be previously set up for each of the sensor nodes P1, P2, . . . , Pn.

Moreover, the timing Δt changed among the plurality of the sensor nodes P1, P2, . . . , Pn can be readjusted in accordance with the control signal ($T_{Xn}$: FIGS. 6B and 7)

included in the second wireless transmission data transmitted from the host H to the plurality of the sensor nodes P1, P2, . . . , Pn.

Moreover, a method of substantially synchronizing the timings of the various kinds of sensor information i among the plurality of the sensor nodes P1, P2, . . . , Pn is as explained in the wireless sensor network system according to the first embodiment, with reference to the timing charts shown in FIGS. 6 and 7, and the flow charts shown in FIGS. 8 and 9

(Wireless Sensor Network System for Bridges)

Figure 17:
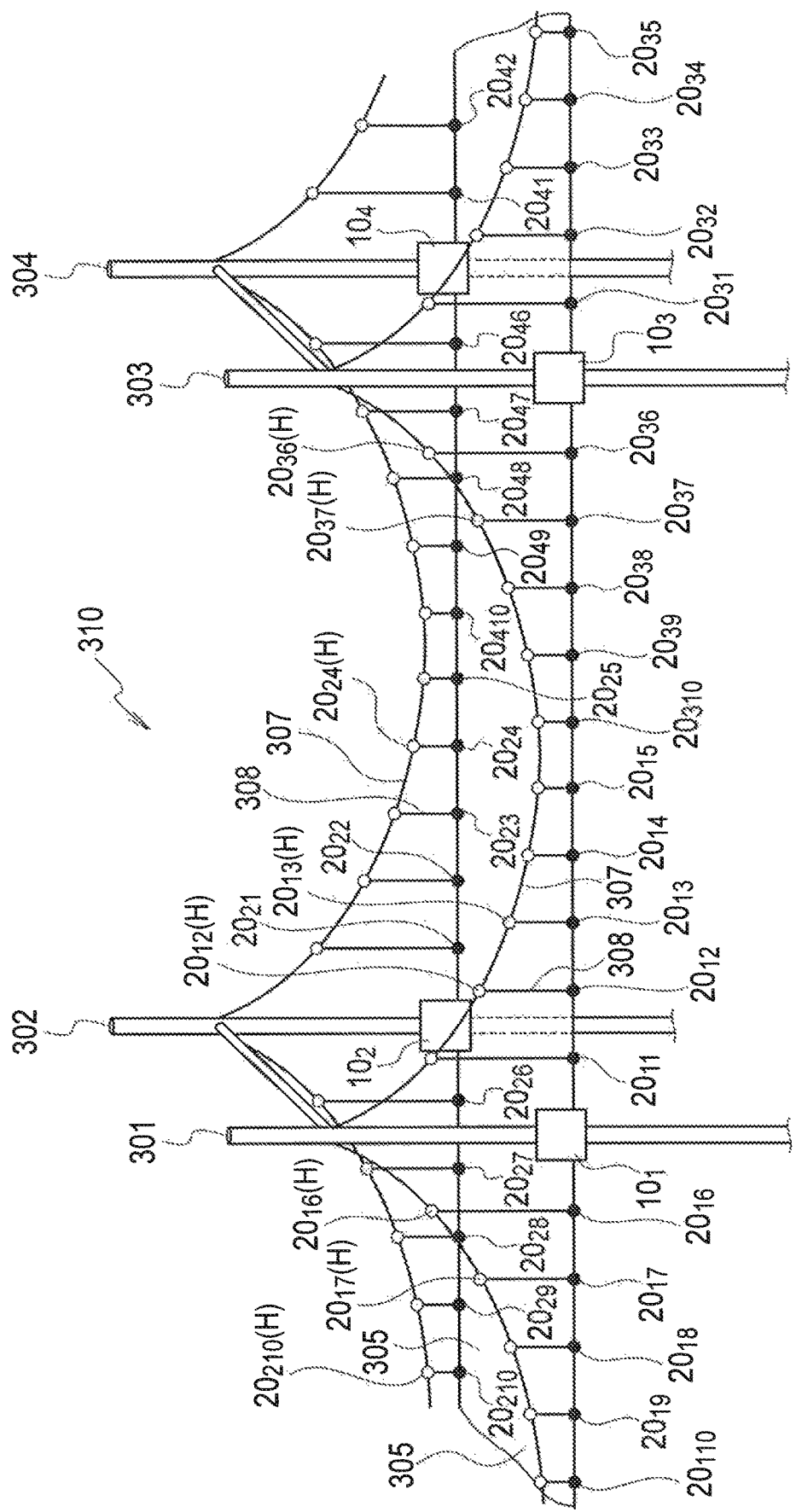
FIG. 17 is a schematic bird's-eye view configuration diagram of a wireless sensor network system for bridges as the wireless sensor network system to which the communication terminal according to the third embodiment can be applied.

FIG. 17 shows a schematic bird's-eye view configuration of a wireless sensor network system for bridges 310 as the wireless sensor network system to which the communication terminal (sensor node) 20 according to the third embodiment can be applied.

As shown in FIG. 17, the wireless sensor network system for bridges 310 to which the communication terminal (sensor node) 20 according to the third embodiment can be applied includes: a plurality of sensor nodes ($20_{11}$, $20_{12}$, . . . , $20_{11}$ (H), $20_{12}$ (H), . . . ), ($20_{21}$, $20_{22}$, . . . $20_{21}$ (H), $20_{22}$ (H), . . . ), ($20_{31}$, $20_{32}$, . . . , $20_{31}$ (H), $20_{32}$ (H), . . . ) ($20_{41}$, $20_{42}$, . . . , $20_{41}$ (H), $20_{42}$ (H), . . . ) and hosts $10_1$, $10_2$, $10_3$, $10_4$ capable of constantly or periodically receiving first wireless transmission data from the plurality of the sensor nodes ($20_{11}$, $20_{12}$, . . . , $20_{11}$ (H), $20_{12}$ (H), . . . ) ($20_{21}$, $20_{22}$, . . . , $20_{21}$ (H), $20_{22}$ (H), . . . ) ($20_{31}$, $20_{32}$, . . . , $20_{31}$ (H), $20_{32}$ (H) ($20_{41}$, $20_{42}$, . . . , $20_{41}$ (H), $20_{42}$ (H), . . . ). In this case, a reception frequency in the host when the host periodically receives the data is more frequent than a transmission frequency of the sensor node.

In the wireless sensor network system for bridges to which the communication terminal according to the third embodiment can be applied, in the same manner as FIGS. 16A to 16C, when the various kinds of sensor information i collected by the plurality of the sensor nodes during the substantially same times ti to ti+1 are transmitted to the hosts through the wireless communications, the timings from the collection of the various kinds of sensor information i to the transmission to the hosts through the wireless communications can be changed among the plurality of the sensor nodes, and thereby a collision of the wireless signal data can be avoided.

For example, timing control may be executed mutually between adjacent hosts $10_1$, $10_2$, $10_3$, $10_4$. Thus, a collision of the wireless signal data is avoidable so that the time periods are not overlapped among a group of the adjacent hosts $10_1$, $10_2$, $10_3$, $10_4$.

In this case, the timing Δt changed among the plurality of the sensor nodes may be previously set up for each of the plurality of the sensor nodes.

Moreover, the timing Δt changed among the plurality of the sensor nodes can be readjusted in accordance with the control signal ($T_{Xh}$: FIGS. 6B and 7) included in the second wireless transmission data transmitted from the hosts to the plurality of the sensor nodes.

The hosts $10_1$, $10_2$, $10_3$, $10_4$ may be disposed on a connected portion between the supports 301, 302, 303, 304 having a predetermined height and a road (or railroad line) 305, for example.

In FIG. 17, wires 307 having suspension-bridge structure are respectively strung between supports 301, 303 and between supports 302, 304, and wires 308 are respectively strung to connected portions of the road (or railroad line) 305 in a substantially vertical direction from the wire 307 having the suspension-bridge structure, and thereby the road (or railroad line) 305 is supported by the supports 301, 302, 303, 304.

The plurality of the sensor nodes ($20_{11}$, $20_{12}$, . . . ), ($20_{21}$, $20_{22}$, . . . ), ($20_{31}$, $20_{32}$, . . . ), ($20_{41}$, $20_{42}$, . . . ) may be disposed at connected portions (shown with the black circle plots) between the plurality of the wires 307 and the roads (or railroad line) 305.

Moreover, the plurality of sensor nodes ($20_{11}$ (H), $20_{12}$ (H), . . . ), ($20_{21}$ (H), $20_{22}$ (H), . . . ) ($20_{31}$ (H), $20_{32}$ (H), . . . ), ($20_{41}$ (H), $20_{42}$ (H), . . . ) may be disposed at connected portions (shown with the white circle plots) between the wires 307 having suspension-bridge structure and the wires 308.

The plurality of the sensor nodes $20_{11}$, $20_{12}$, . . . , $20_{11}$ (H), $20_{12}$ (H), . . . are capable of executing wireless transmission and reception to/from the host $10_1$, for example. Similarly, the plurality of the sensor nodes $20_{21}$, $20_{22}$, . . . , $20_{21}$ (H), $20_{22}$ (H), . . . are capable of executing wireless transmission and reception to/from the host $10_2$; The plurality of the sensor nodes $20_{31}$, $20_{32}$, . . . , $20_{31}$ (H), $20_{32}$ (H), . . . are capable of executing wireless transmission and reception to/from the host $10_3$; and The plurality of the sensor nodes $20_{41}$, $20_{42}$, . . . , $20_{41}$ (H), $20_{42}$ (H), . . . are capable of executing wireless transmission and reception to/from the host $10_4$.

Information collected in the hosts $10_1$, $10_2$, $10_3$, $10_4$ can be supplied to a cloud computing system through the Internet line etc., and then can be integrally managed therein.

The communication terminal according to the third embodiment and the wireless sensor network system 310 to which such a communication terminal can be applied can operate in the same manner as the communication terminals according to the first and second embodiments and the wireless sensor network system to which the communication terminal can be applied.

Moreover, the same configuration as the first embodiment and a second embodiment can be adopted to the configuration of the sensor node 20 (P) functioning as the communication terminal according to the third embodiment.

According to the third embodiment, there can be provided the communication terminal capable of avoiding the collision wireless signal data and capable of executing the power saving communication, and the wireless sensor network system to which such a communication terminal can be applied.

[Fourth Embodiment]

Figure 18:
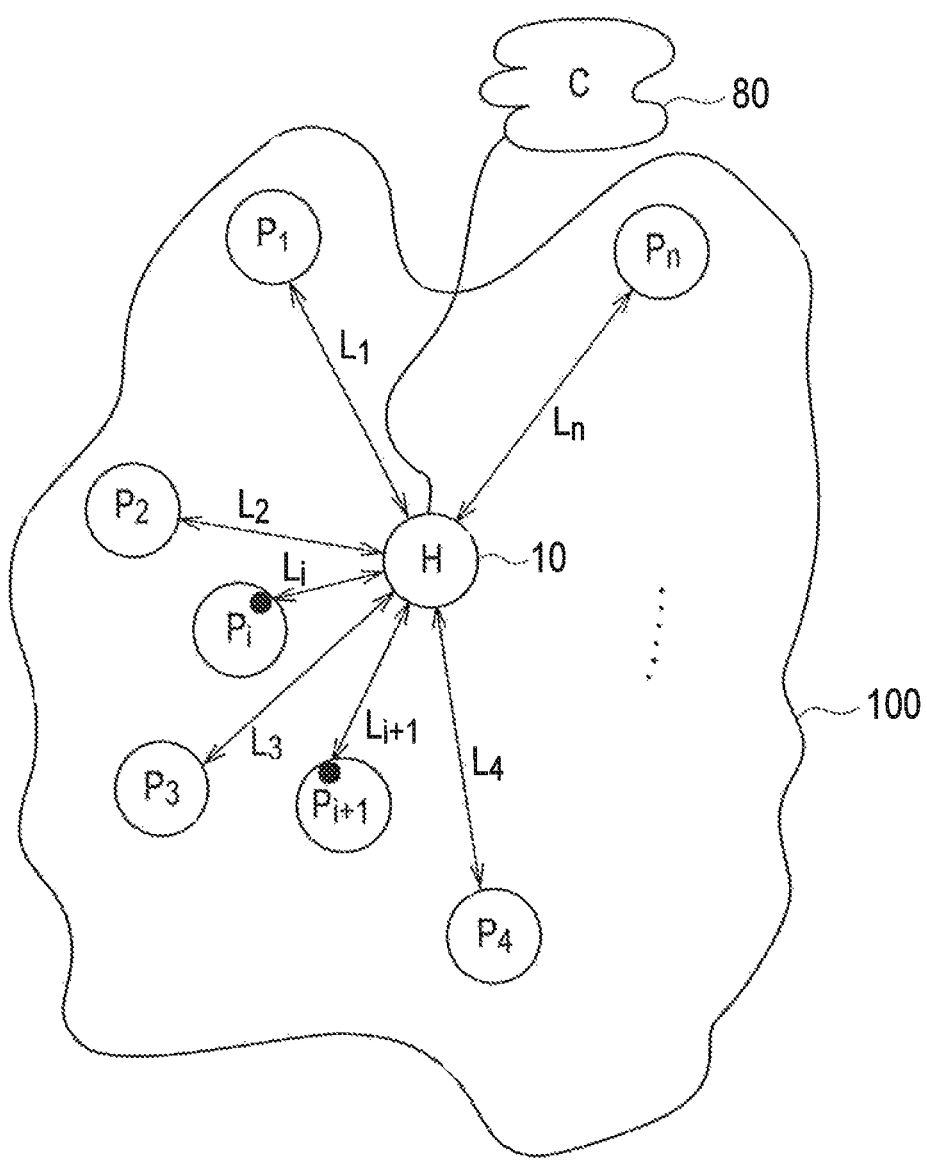
FIG. 18 is a schematic configuration diagram of the wireless sensor network system to which the communication terminal according to the fourth embodiment can be applied.

FIG. 18 shows a schematic configuration of a wireless sensor network system 100 to which a communication terminal (sensor node) according to the fourth embodiment can be applied.

As shown in FIG. 18, the wireless sensor network system 100 to which the communication terminal (sensor node) according to the fourth embodiment can be applied includes: a plurality of sensor nodes $P_1$, $P_2$, . . . , $P_i$, $P_{i+1}$, . . . , $P_n$; and hosts 10 capable of constantly or periodically receiving first wireless transmission data from the plurality of sensor nodes $P_1$, $P_2$, . . . , $P_i$, $P_{i+1}$, . . . , $P_n$. In FIG. 18, distances between the plurality of sensor nodes $P_1$, $P_2$, . . . , $P_i$, $P_{i+1}$, . . . , $P_n$ and the host 10 is expressed with $L_1$, $L_2$, . . . , $L_i$, $L_{i+1}$, . . . , $L_n$. In this case, a reception frequency in the host when the host periodically receives the data is more frequent than a transmission frequency of the sensor node.

The plurality of the sensor nodes $P_1$, $P_2$, . . . , $P_i$, $P_{i+1}$, . . . , $P_n$ can receive the second wireless transmission data from the host 10 side during only a predetermined short time period after transmission of the first wireless transmission data is completed. In this case, the first wireless transmission data are transmitted in predetermined timing from the plurality of the sensor nodes $P_1, P_2, \ldots, P_i, P_{i+1}, \ldots, P_n$ to the host 10.

Moreover, the second wireless transmission data is transmitted from the host 10 side to the plurality of the sensor nodes $P_1, P_2, \ldots, P_i, P_{i+1}, \ldots, P_n$ during only a predetermined short time period after transmission of the first wireless transmission data is completed.

Power consumption reduction of the wireless sensor network system 100 to which the communication terminal according to the fourth embodiment can be applied can be realized by configuring so that the plurality of the sensor nodes $P_1, P_2, \ldots, P_i, P_{i+1}, \ldots, P_n$ can receive the transmitted data from the host 10 side during only the predetermined short time period after transmission of the wireless transmission data is completed. That is, the power consumption can be further reduced since there is no need of constantly turning ON the receiver in the plurality of the sensor nodes $P_1, P_2, \ldots, P_i, P_{i+1}, \ldots, P_n$.

Information collected in the host 10 can be supplied to a cloud computing system through the Internet line etc., and then can be integrally managed therein. Cable communications or wireless communications different from the present wireless communications through the Internet line are applicable to the data communications between the host H and the cloud 80.

In the wireless sensor network system 100 to which the communication terminal according to the fourth embodiment can be applied, a data communication rate D (kbps) between the plurality of the sensor nodes $P_1, P_2, \ldots, P_i, P_{i+1}, \ldots, P_n$ and the host 10 (H) can be changed.

If the communication rate D (kbps) is reduced, the receiving sensitivity S is increased and thereby the transmission distance L is secured. As a result, a transmission time is increased. On the other hand, the communication rate D (kbps) may be increased if sufficient receiving sensitivity S can be secured. As a result, the transmission time can be shortened, and therefore low-power consumption operation can be realize, thereby reducing required electric power.

If the receiving sensitivity S of a wireless data signal level from the sensor node Pi to the host 10 (H) is relatively high, an instruction to increase the communication rate is transmitted to the sensor node Pi from the host 10 (H). If the communication rate D (kbps) of the transmitting data from the sensor node Pi to the host 10 (H) increased, consequently, a low-power consumption operation can be realized since a transmission time can be relatively shortened. Moreover, a probability of data collision between the plurality of the sensor nodes $P_1, P_2, \ldots, P_i, P_{i+1}, \ldots, P_n$ can be reduced since the transmission time can be relatively shortened.

The fourth embodiment can provide the wireless sensor network system having the plurality of communication rate functions, and therefore it is preferred for the purpose of covering wide range area, e.g. bridges, farms, and forests.

In the wireless sensor network system 100 to which the communication terminal according to the fourth embodiment can be applied, the data communication rate D (kbps) between the plurality of the sensor nodes $P_1, P_2, \ldots, P_i, P_{i+1}, \ldots, P_n$ and the host 10 (H) can be changed, and thereby a total amount of transmission data can be consequently suppressed.

In the wireless sensor network system 100 to which the communication terminal according to the fourth embodiment can be applied, since the low-power consumption operation can be realized, the data communication rate D can be reduced, and thereby amount of data is relatively small, i.e., the total amount of transmission data can be consequently suppressed.

For example, the wireless sensor network system for bridges, etc. detect the sensor information, e.g. temperature, humidity, and vibration, as continuous data. If communications with lower data communication rates are stable, the host 10 (H) can send an instruction to increase the data communication rate to the sensor nodes $P_1, P_2, \ldots, P_i, P_{i+1}, \ldots, P_n$. As a consequence, the sensor nodes $P_1, P_2, \ldots, P_i, P_{i+1}, \ldots, P_n$ can transmit large amounts of data to the host 10 (H).

On the other hand, when the plurality of the sensor nodes $P_1, P_2, \ldots, P_i, P_{i+1}, \ldots, P_n$ are intended to operate as an energy harvester on a bridge etc., it is preferable that it is not necessary to uselessly transmit a signal for maintaining the wireless sensor network from the plurality of the sensor nodes $P_1, P_2, \ldots, P_i, P_{i+1}, \ldots, P_n$. The data transmission from the sensor nodes is executed with a low communication rate, and a receiving opportunity is set up for only few time periods in the sensor node, and thereby the power-saving wireless sensor network system with sleep mode can be realized during other time period.

FIG. 19A is a schematic timing chart of a data signal in the host H, in the wireless sensor network system to which the communication terminal according to the fourth embodiment can be applied. FIG. 19B shows a schematic timing chart of a data signal in the sensor node Pi corresponding to FIG. 19A.

(a) Firstly, during time t1 to t2, the sensor node Pi transmits wireless transmission data $T_{xP1-1}$ to the host H with an initial communication rate of 1 kbps, and then the host H receives the wireless receiving data $R_{xC1-1}$ from the sensor node Pi with Received Signal Strength Indication (RSSI) of approximately −100 dBm, for example.

(b) Next, the sensor node Pi opens a reception window $R_{xP1-1}$ to be shifted to a reception waiting mode for waiting the wireless transmission data from the host H (Talk after Listen Mode).

(c) Next, during time t3 to t31, the sensor node Pi transmits wireless transmission data $T_{xP1-2}$ to the host H with a communication rate of 1 kbps. The host H then receives wireless receiving data $R_{xC1-2}$ from the sensor node Pi with RSSI of approximately −90 dBm, for example, during time t3 to t4.

(d) Next, during time t4 to t5, the host H transmits wireless transmission data $T_{xC1-1}$ including an instruction for increasing the communication rate (e.g., instructions for increasing the communication rate up to 10 kbps) to the sensor node Pi with a master rate mode.

(e) Next, during time t4 to t5, the sensor node Pi detects transmission from the host H, and then receives packet $R_{xC12}$ from the host.

(f) Next, during time t6 to t7, the sensor node Pi transmits wireless transmission data $T_{xP1-3}$ to the host H with a communication rate of 10 kbps. The host H then receives wireless receiving data $R_{xC1-3}$ from the sensor node Pi with RSSI of approximately −93 dBm, for example.

(g) Next, the sensor node Pi opens a reception window $R_{xP1-3}$ to be shifted to a reception waiting mode for waiting the data from the host H (Talk after Listen Mode).

Although there has been shown an example of increasing from the initial communication rate of 1 kbps up to 10 kbps, as mentioned above, the communication rate is not limited to such values.

The communication rates may be from the initial communication rate of 1 kbps up to 12.5 kbps, 20 kbps, . . . , 50 kbps, 100 kbps, or 200 kbps (capable of supporting IEEE standard), for example. Moreover, a data communication rate of 400 kbps can also applied thereto.

Conversely, an operation for decreasing the communication rate can also be executed, resulting from aggravation of RSSI.

If the same-sized data (e.g., 100 bits) is transmitted, a time period required for the sensor node to transmit such data is 100 msec, in the case of 1 kbps, and 10 msec in the case of 10 kbps. Accordingly, the power consumption of the sensor node can remarkably be reduced.

On the other hand, if the transmitting operation time is the same thereas (e.g., 100 msec), an amount of data which can be transmitted by the sensor node in one transmitting operation is 100 bits in the case of 1 kbps, and is 1000 bits in the case of 10 kbps, and thereby a large quantity of data can be transmitted.

In particular in Japan, the maximum time period of one transmission is limited up to 50 msec in Radio Act, and therefore if the communication rate is relatively low, an amount of data which can be transmitted is restricted.

It has been known that a communication distance which can be transmitted can be extended even if it uses the same transmission power, as a merit of relatively low communication rate. This is derived from a point in that the receiving sensitivity of the receiver can be increased in accordance with the reduction of the communication rate.

Figure 20A:
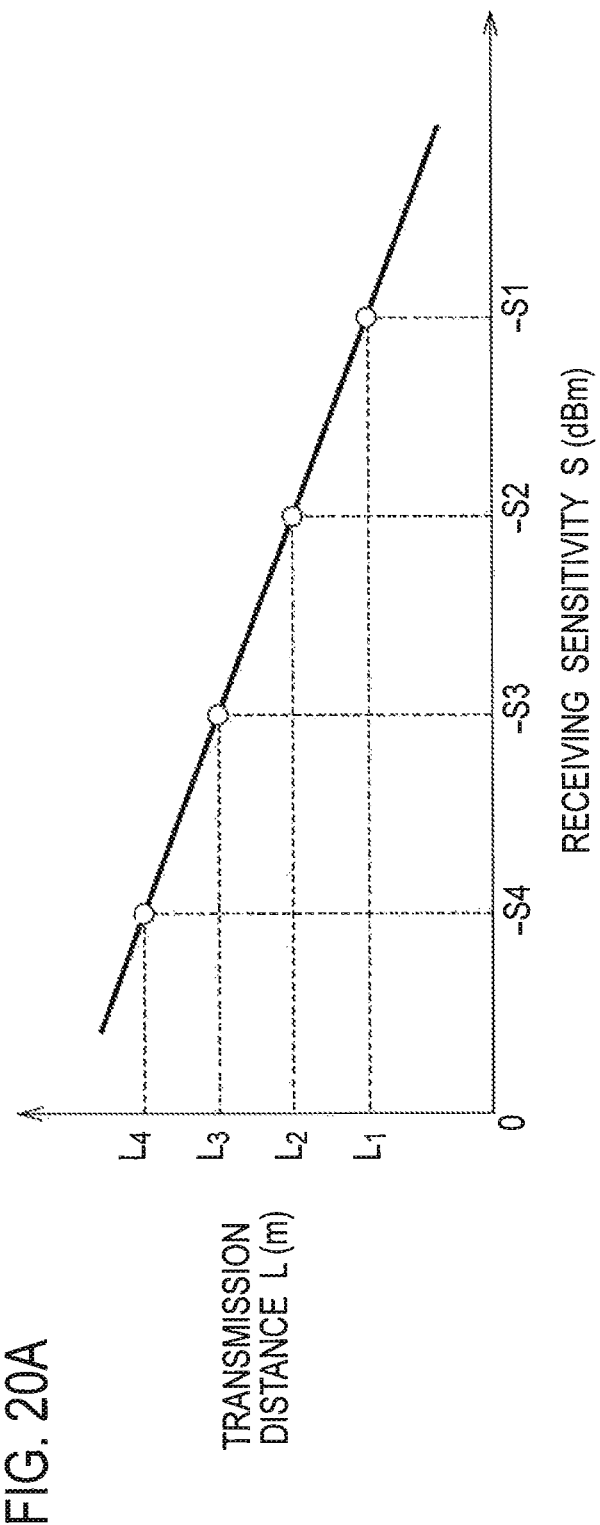
FIG. 20A is a schematic diagram showing a relationship between a transmission distance L (m) and a receiving sensitivity S (dBm) in between the host H and the sensor node Pi, in the wireless sensor network system to which the communication terminal according to the fourth embodiment can be applied.
Figure 20B:
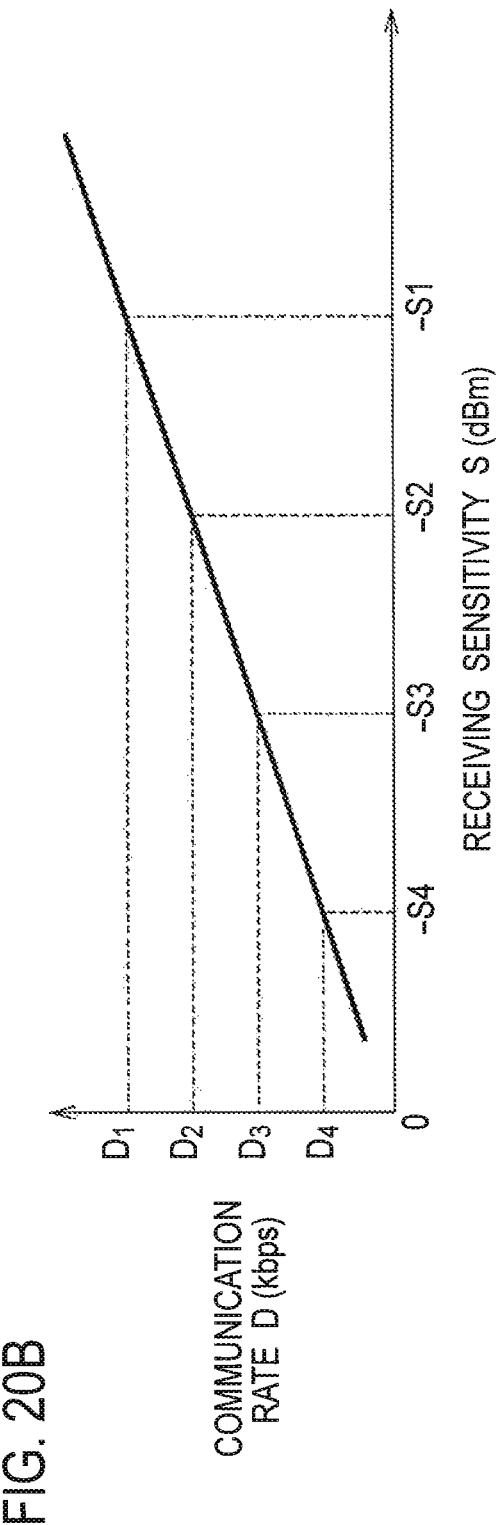
FIG. 20B is a schematic diagram showing a relationship between a communication rate D (kbps) and a receiving sensitivity S (dBm) in between the host H and the sensor node Pi, in the wireless sensor network system to which the communication terminal according to the fourth embodiment can be applied.

In the wireless sensor network system to which the communication terminal according to the fourth embodiment can be applied, FIG. 20A schematically shows a relationship between the transmission distance L (m) and the receiving sensitivity S (dBm) in between the host H and the sensor node Pi, and FIG. 20B schematically shows a relationship between the communication rate D (kbps) and the receiving sensitivity S (dBm) in between the host H and the sensor node Pi.

In the wireless sensor network system 100 to which the communication terminal according to the fourth embodiment can be applied, the data communication rate D (kbps) between the plurality of the sensor nodes $P_1, P_2, \ldots, P_i, P_{i+1}, \ldots, P_n$ and the host 10 (H) can be changed, and thereby it is available to use the wireless sensor network system in relatively wide area (e.g., several kilometers) (bridges, tunnels, farms, etc.). The sensor node to which the communication system suitable for low electric power (in particular, energy harvesters (solar panels of several centimeters square, etc.)) is applied as power supply is available in a case where communications for network establishment (synchronous communications) is difficult to be realized in the light of an electric power requirement.

(Communication Terminal: Host)

Figure 21A:
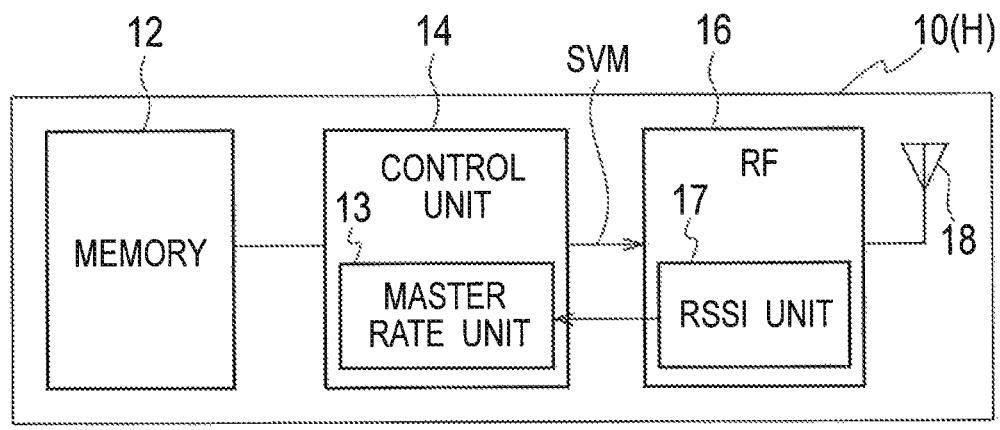
FIG. 21A is a schematic block configuration diagram of a host capable of executing wireless communications with the communication terminal according to the fourth embodiment.

As shown in FIG. 21A, a schematic block configuration of the host 10 (H) capable of executing the wireless communications with the sensor node communication terminal according to the fourth embodiment includes: a memory 12; a control unit 14 connected to the memory 12; a wireless transmission/reception unit (RF) 16 connected to the control unit 14; and an antenna 18 connected to the wireless transmission/reception unit (RF) 16.

The host 10 (H) collects sensing data from the sensor nodes P1-Pn through the wireless communications. Moreover, the host 10 (H) has a function capable of supporting to various communication rates. Moreover, the host 10 (H) has a function for measuring RSSI of received electromagnetic waves. Moreover, the host 10 (H) has a function for specifying change of the communication rate with respect to the sensor nodes P1-Pn, in accordance with RSSI (Master Rate Mode). The communication rate change specifying signal may be included in the data request signal or the control signal ($T_{Xn}$: FIGS. 6B and 7) in the second wireless transmission data. For this reason, as shown in FIG. 21A, the wireless transmission/reception unit (RF) 16 includes an RSSI unit 17 configured to measure the received signal strength indication (RSSI) of the received electromagnetic waves, and the control unit 14 includes a master rate unit 13 configured to specify the change of the communication rate with respect to the sensor nodes P1-Pn in accordance with the RSSI measured in the RSSI unit 17. The communication rate change specifying signal SVM for specifying the change of the communication rate with respect to the sensor nodes P1-Pn is supplied 16 from the control unit 14 to the wireless transmission/reception unit (RF) 16, and then is transmitted from the wireless transmission/reception unit (RF) 16 to the sensor nodes P1-Pn through the antenna 18. Other configurations are the same as the configuration of the host 10 (H) (FIG. 4A) in the first embodiment.

(Communication Terminal: Sensor Node)

Figure 21B:
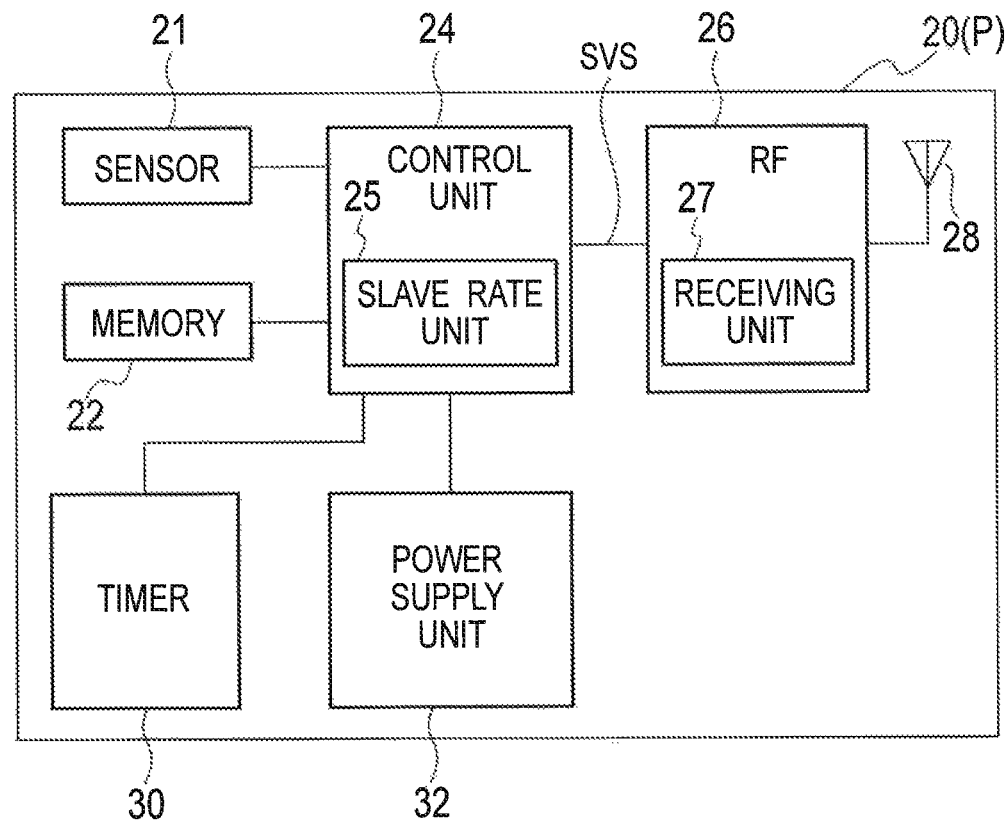
FIG. 21B is a schematic block configuration diagram of a sensor node functioning as the communication terminal according to the fourth embodiment.

On the other hand, as shown in FIG. 21B, a schematic block configuration of the sensor node 20 (P) functioning as the communication terminal according to the fourth embodiment includes: a sensor 21 capable of collect sensor information at an installed location in autonomous timing; a control unit 24 connected to the sensor 21, the control unit 24 capable of executing calculation processing of the sensor information; a memory 22 connected to the control unit 24; a wireless transmission/reception unit (RF) 26 connected to the control unit 24; an antenna 28 connected to the wireless transmission/reception unit 26, the antenna 28 capable of wirelessly transmitting the sensor information or a result of the calculation processing of the sensor information; a power supply unit 32 connected to the control unit 24; and a timer 30 connected to the control unit 24. The plurality of the sensor nodes 20 (P) can receive the transmission data (sensing data) from the host 10 side during only a predetermined short time period after transmission of the wireless transmission data is completed. That is, as explained with reference to FIGS. 6-9 in the first embodiment, the sensor nodes P1-Pn have a function for detecting a presence or absence of the communications from the host H immediately after transmitting the sensing data (Talk after Listen Mode).

The sensor nodes P1-Pn mount various kinds of sensors, and transmit a measured value or a calculated result of the measured value to the host H through the wireless communications. Moreover, the sensor nodes P1-Pn have a function for changing the communication rate, in accordance with the instruction sent from the host (Slave Rate Mode).

For this reason, as shown in FIG. 21B, the wireless transmission/reception unit (RF) 26 includes a receiving unit 27 configured to receive the instruction sent from the host, and the control unit 24 includes a slave rate unit 25 configured to instruct the change of the communication rate with respect to the host 10 (H) in accordance with the instruction, sent from the host, received in the receiving unit 27. The communication rate change instruction signal SVS with respect to the host 10 (H) is supplied to the wireless transmission/reception unit (RF) 26 from the control unit 24, and then is transmitted from the wireless transmission/reception unit (RF) 26 to the sensor nodes P1-Pn through the antenna 28. Other configurations are the same as the configuration of the sensor node 20 (P) (FIG. 4B) in the first embodiment.

Modified Example

Figure 22:
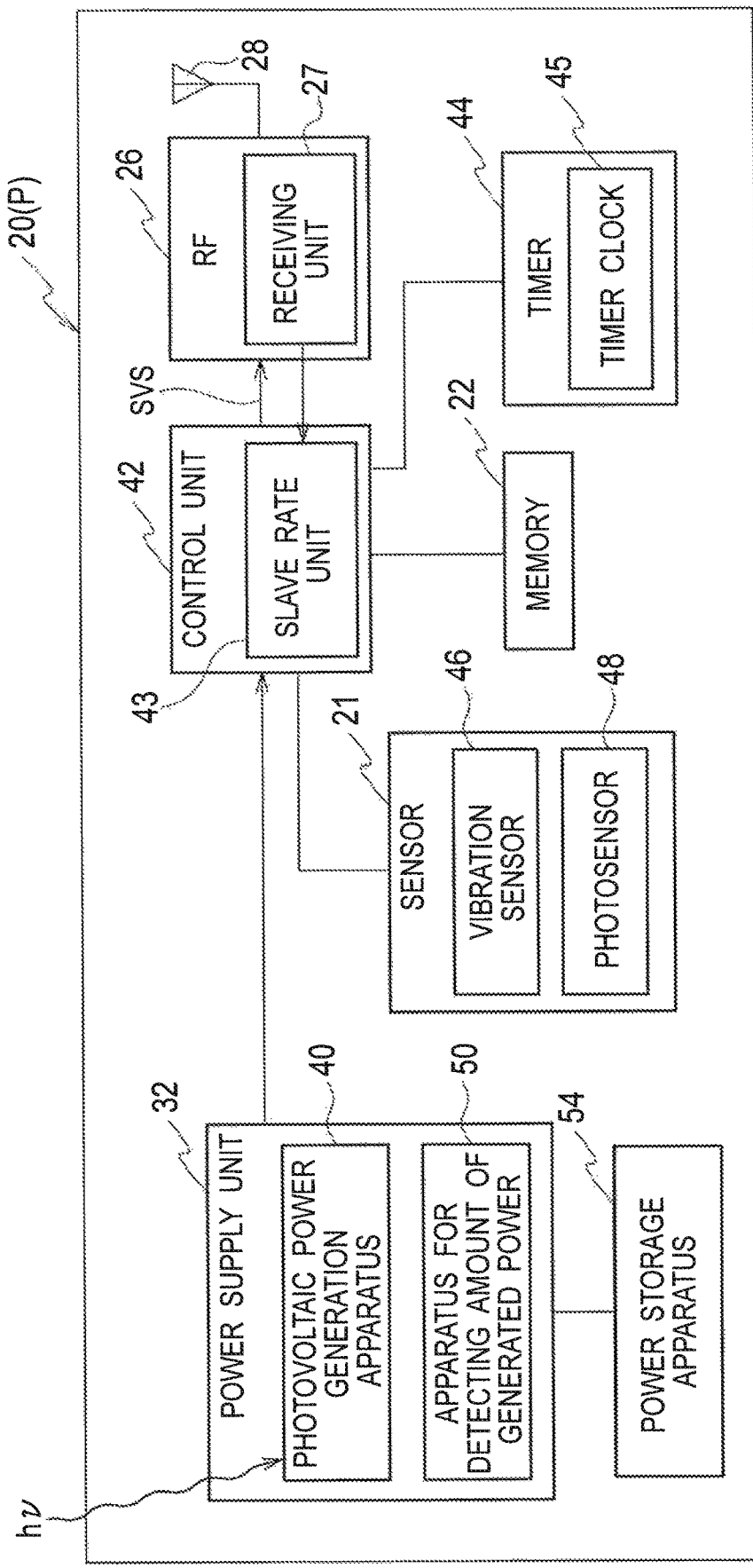
FIG. 22 is a schematic block configuration diagram of a sensor node, including a photovoltaic generation apparatus, which is a communication terminal according to a modified example of the fourth embodiment.

FIG. 22 shows a schematic block configuration of a sensor node 20 (P), including a photovoltaic generation apparatus 40, which is a sensor node 20 (P) functioning as a communication terminal according to a modified example of the fourth embodiment.

As shown in FIG. 22, a schematic block configuration of the sensor node 20 (P) functioning as the communication terminal according to the modified example of the fourth embodiment includes: a sensor 21 capable of collect sensor information at an installed location in autonomous timing; a control unit 42 connected to the sensor 21, the control unit 42 capable of executing calculation processing of the sensor information; a memory 22 connected to the control unit 42; a wireless transmission/reception unit (RF) 26 connected to the control unit 42; an antenna 28 connected to the wireless transmission/reception unit 26, the antenna 28 capable of wirelessly transmitting the sensor information or a result of the calculation processing of the sensor information; a power supply unit 32 connected to the control unit 42; and a timer 44 connected to the control unit 42. On this case, the plurality of the sensor nodes 20 (P) can receive the transmission data (sensing data) from the host 10 side during only a predetermined short time period after transmission of the wireless transmission data is completed.

The power supply unit 32 includes: a photovoltaic generation apparatus 40; and an apparatus 50 for detecting amount of generated power connected to the photovoltaic generation apparatus 40, the apparatus 50 for detecting amount of generated power configured to measure an amount of photovoltaic generated power. The apparatus 50 for detecting amount of generated power configured to measure the amount of the photovoltaic generated power may include a peak-power tracking function. Moreover, a power storage apparatus 54 may be connected to the power supply unit 32. Capacitors, lithium ion capacitors, Electric Double-Layer Capacitors (EDLCs), etc. are applicable to the power storage apparatus 54. In addition, the power storage apparatus 54 may be contained in the power supply unit 32.

Also in the modified example of the fourth embodiment, the sensor nodes P1-Pn have a function for detecting a presence or absence of the communications from the host H immediately after transmitting the sensing data, in the same manner as the fourth embodiment. (Talk after Listen Mode). Moreover, the sensor nodes P1-Pn have a function for changing the communication rate, in accordance with the instruction sent from the host (Slave Rate Mode).

For this reason, as shown in FIG. 22, the wireless transmission/reception unit (RF) 26 includes a receiving unit 27 configured to receive the instruction sent from the host, and the control unit 24 includes a slave rate unit 43 configured to instruct the change of the communication rate with respect to the host 10 (H) in accordance with the instruction, sent from the host, received in the receiving unit 27. The communication rate change instruction signal SVS with respect to the host 10 (H) is supplied to the wireless transmission/reception unit (RF) 26 from the control unit 42 and then is transmitted from the wireless transmission/reception unit (RF) 26 to the sensor nodes P1-Pn through the antenna 28. Other configurations are the same as the configuration of the sensor node 20 (P) (FIG. 10) in the second embodiment.

According to the fourth embodiment, the total amount of transmission data can be suppressed by realizing the change of the data communication rate between the plurality of the sensor nodes and the host, and thereby there can be provided the communication terminal capable of executing the power saving communication, and the wireless sensor network system to which such a communication terminal can be applied.

As mentioned above, according to the embodiments, there can be provided the communication terminal capable of executing the power saving communication, and the wireless sensor network system to which such a communication terminal can be applied.

[Other Embodiments]

The first to fourth embodiments have been described, as a disclosure including associated description and drawings to be construed as illustrative, not restrictive. This disclosure makes clear a variety of alternative embodiment, working examples, and operational techniques for those skilled in the art.

Such being the case, the embodiments cover a variety of embodiments, whether described or not.

INDUSTRIAL APPLICABILITY

The communication terminal and the wireless sensor network system according to the embodiments are applicable to areas covering large areas, e.g. bridges, farms, forests, etc., and can obtain various kinds of sensor information, e.g. temperature, humidity, vibration, strain, etc. as continuous data in the plurality of the sensor node communication terminals, and therefore can be applied to system applications capable of executing the wireless transmission to the host with low power consumption.

What is claimed is:

1. A sensor node communication terminal comprising:
a sensor operable to collect sensor information at a location where the sensor is installed, the sensor collecting the sensor information in autonomous timing;
a control unit connected to the sensor, the control unit operable to execute calculation processing of the sensor information collected by the sensor;
a memory connected to the control unit;
a wireless transmission/reception unit connected to the control unit;
an antenna connected to the wireless transmission/reception unit, the antenna operable to transmit wirelessly first wireless transmission data, comprising the sensor information or a result of the calculation processing of the sensor information and to receive second wireless transmission data from a host, said host being configured to collect the first wireless transmission data and to control the sensor node;
a power supply unit connected to the control unit; and
a timer connected to the control unit, the timer adapted to supply a timer count value used for a timing control of the sensor node,
wherein:
the sensor node communication terminal is operable such that when the first wireless transmission data is transmitted in the autonomous timing from the antenna to the host, the sensor node provides, to the host, after transmission of the first wireless transmission data, a reception window indicating a predetermined time period during which the sensor node can receive the second wireless transmission data from the host, and
if no second wireless transmission data is transmitted from the host to the sensor node during the reception window, or if the second wireless transmission data transmitted from the host to the sensor node is a control signal, the sensor node closes the reception window and is shifted to a sleep mode, and
wherein a period of the sleep mode is determined on the basis of the timer count value supplied from the timer, and wherein after expiration of said period, the sensor node will initiate a next transmission of the next first wireless transmission data.

2. The sensor node communication terminal according to claim 1, wherein the first wireless transmission data transmitted from the antenna to the host comprises a flag indicating whether or not the sensor node continuously executes reception waiting.

3. The sensor node communication terminal according to claim 2, wherein
the sensor node provides a reception waiting time period after transmitting the first wireless transmission data to the host, wherein
if the second wireless transmission data transmitted from the host to the sensor node is a data request signal, the sensor node transmits third wireless transmission data to the host in accordance with the data request signal after closing the receiving window, without being shifted to the sleep mode.

4. The sensor node communication terminal according to claim 2, wherein
a determination factor for determining whether or not the sensor node continuously executes the reception waiting is time or information equivalent to time.

5. The sensor node communication terminal according to claim 2, wherein
a determination factor for determining whether or not the sensor node continuously executes the reception waiting is information regarding number of times.

6. The sensor node communication terminal according to claim 2, wherein
a determination factor for determining whether or not the sensor node continuously executes the reception waiting is information regarding a matching determination result between the collected sensor information and a determination criterion previously determined.

7. The sensor node communication terminal according to claim 2, wherein
a determination factor for determining whether or not the sensor node continuously executes the reception waiting may be information regarding a matching determination result between the collected sensor information in addition to sensor information collected until now and a determination criterion previously determined.

8. The sensor node communication terminal according to claim 1, wherein
the sensor node provides a reception waiting time period after transmitting the first wireless transmission data to the host, wherein
if the second wireless transmission data transmitted from the host to the sensor node is a data request signal, the sensor node transmits third wireless transmission data to the host in accordance with the data request signal after closing the receiving window, without being shifted to the sleep mode.

9. The sensor node communication terminal according to claim 1, further comprising
a timer clock which executes a substantially time adjustment of the timer when misoperation of the timer occurs.

10. The sensor node communication terminal according to claim 1, wherein
the sensor node includes a talk-after-listen mode function for detecting a presence or absence of communications from the host immediately after transmitting the first wireless transmission data.

11. A host communication terminal comprising:
a control unit;
a memory connected to the control unit;
a wireless transmission/reception unit connected to the control unit; and
an antenna connected to the wireless transmission/reception unit, wherein
the wireless transmission/reception unit comprises an RSSI unit configured to measure the received signal strength indication of the received electromagnetic wave, wherein
the control unit comprises a master rate unit configured to instruct change of the communication rate with respect to a side of the plurality of the sensor nodes according to claim 1 in accordance with the received signal strength indication measured in the RSSI unit, wherein
the host communication terminal receives first wireless transmission data from the plurality of sensor nodes through wireless communications, collects sensing data included the received first wireless transmission data, and transmits second wireless transmission data for instructing change of a communication rate specified with respect to the plurality of the sensor nodes in accordance with a received signal strength indication of a received electromagnetic wave.

12. The host communication terminal according to claim 11, wherein
the host communication terminal transmits the second wireless transmission data to the plurality of sensor nodes during only a predetermined time period after the respective sensor nodes transmit the first wireless transmission data to the host communication terminal.

13. A wireless sensor network system comprising:
a plurality of sensor nodes; and
a host operable to receive constantly or periodically first wireless transmission data separately transmitted from the individual sensor nodes, wherein
the individual sensor nodes can receive a second wireless transmission data separately transmitted from the host side during only a predetermined time period after transmission of the first wireless transmission data is completed, wherein
each sensor node comprises:
a sensor operable to collect sensor information at a location where the sensor is installed, the sensor collecting the sensor information in autonomous timing;
a control unit connected to the sensor, the control unit operable to execute calculation processing of the sensor information collected by the sensor;
a memory connected to the control unit;
a wireless transmission/reception unit connected to the control unit;
an antenna connected to the wireless transmission/reception unit, the antenna capable of wirelessly transmitting first wireless transmission data comprising the sensor information or a result of the calculation processing of the sensor information and to receive second wireless transmission data from a host, said host being configured to collect the first wireless transmission data and to control the sensor node;
a power supply unit connected to the control unit; and
a timer connected to the control unit, the timer adapted to supply a timer count value used for a timing control of the sensor node, wherein:
> the wireless sensor network system is operable such that when the first wireless transmission data is transmitted in the autonomous timing from the antenna to the host, the sensor node provides, to the host, after transmission of the first wireless transmission data, a reception window indicating a predetermined time period during which the sensor node can receive the second wireless transmission data from the host, and
>
> if no second wireless transmission data is transmitted from the host to the sensor node during the reception window, or if the second wireless transmission data transmitted from the host to the sensor node is a control signal, the sensor node closes the reception window and is shifted to a sleep mode, and
>
> wherein a period of the sleep mode is determined on the basis of the timer count value supplied from the timer, and wherein after expiration of said period, the sensor node will initiate a next transmission of the next first wireless transmission data.

14. The wireless sensor network system according to claim 13, wherein
> when various kinds of sensor information collected at a substantially same time in the plurality of the sensor nodes is transmitted to the host by wireless communications, timings from the collection of the various kinds of sensor information to the transmission to the hosts through the wireless communications are changed among the plurality of the sensor nodes, and thereby a collision of wireless signal data can be avoided, in the plurality of the sensor nodes.

* * * * *